US012621582B2

(12) United States Patent
Anjyou

(10) Patent No.: US 12,621,582 B2
(45) Date of Patent: May 5, 2026

(54) SOLID-STATE IMAGE SENSOR, IMAGING APPARATUS, AND CONTROL METHOD FOR SOLID-STATE IMAGE SENSOR

(71) Applicant: SONY SEMICONDUCTOR SOLUTIONS CORPORATION, Kanagawa (JP)

(72) Inventor: Kenichirou Anjyou, Kumamoto (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 56 days.

(21) Appl. No.: 18/700,148

(22) PCT Filed: Sep. 16, 2022

(86) PCT No.: PCT/JP2022/034705
§ 371 (c)(1),
(2) Date: Apr. 10, 2024

(87) PCT Pub. No.: WO2023/067961
PCT Pub. Date: Apr. 27, 2023

(65) Prior Publication Data
US 2024/0406590 A1 Dec. 5, 2024

(30) Foreign Application Priority Data

Oct. 18, 2021 (JP) ................................. 2021-170376
Oct. 27, 2021 (JP) ................................. 2021-175889

(51) Int. Cl.
*H04N 25/532* (2023.01)
*H04N 25/65* (2023.01)
*H04N 25/771* (2023.01)

(52) U.S. Cl.
CPC ........... *H04N 25/532* (2023.01); *H04N 25/65* (2023.01); *H04N 25/771* (2023.01)

(58) Field of Classification Search
CPC .............................. H04N 25/532; H04N 25/65
(Continued)

(56) References Cited

U.S. PATENT DOCUMENTS

| | | | | |
|---|---|---|---|---|
| 7,755,018 B2 * | 7/2010 | Barna | .................. | H04N 25/671 |
| | | | | 348/241 |
| 2003/0141497 A1 * | 7/2003 | Watanabe | ............... | H10F 39/18 |
| | | | | 348/E3.018 |

(Continued)

FOREIGN PATENT DOCUMENTS

| | | |
|---|---|---|
| JP | 2010-034890 A | 2/2010 |
| JP | 2020-039017 A | 3/2020 |
| WO | 2019/069614 A1 | 4/2019 |

OTHER PUBLICATIONS

International Search Report and Written Opinion of PCT Application No. PCT/JP2022/034705, issued on Nov. 15, 2022, 09 pages of ISRWO.

(Continued)

*Primary Examiner* — Lin Ye
(74) *Attorney, Agent, or Firm* — CHIP LAW GROUP

(57) ABSTRACT

Provided is a solid-stage image sensor of the voltage domain type. The image sensor includes a transfer transistor, a reset transistor, a pre-stage amplification transistor, and a vertical scanning circuit. The reset transistor transfers charge from a photoelectric conversion element to a floating diffusion layer. The reset transistor initializes the floating diffusion layer. The pre-stage amplification transistor amplifies and outputs a voltage of the floating diffusion layer. A plurality of capacitive elements hold the outputted voltage. The vertical scanning circuit performs soft reset on the pre-stage amplification transistor when a reset level that is the voltage when the floating diffusion layer is initialized is to be held in any one of the plurality of capacitive elements.

10 Claims, 41 Drawing Sheets

(58) Field of Classification Search
USPC .......................................................... 348/308
See application file for complete search history.

(56) References Cited

U.S. PATENT DOCUMENTS

| | | | | |
|---|---|---|---|---|
| 2011/0121162 A1* | 5/2011 | Murata | ................ | H04N 25/771 |
| | | | | 250/214 P |
| 2019/0068905 A1* | 2/2019 | Suzuki | ................. | H04N 25/709 |
| 2020/0265909 A1* | 8/2020 | Matsuura | ............. | H04N 25/616 |
| 2021/0185251 A1* | 6/2021 | Yonemoto | ............ | H04N 25/709 |

OTHER PUBLICATIONS

Park, et al., "A 2.2μm stacked back side illuminated voltage domain global shutter CMOS image sensor", IEEE International Electron Devices Meeting (IEDM), Dec. 7-11, 2019, 04 pages.

* cited by examiner

F I G . 2
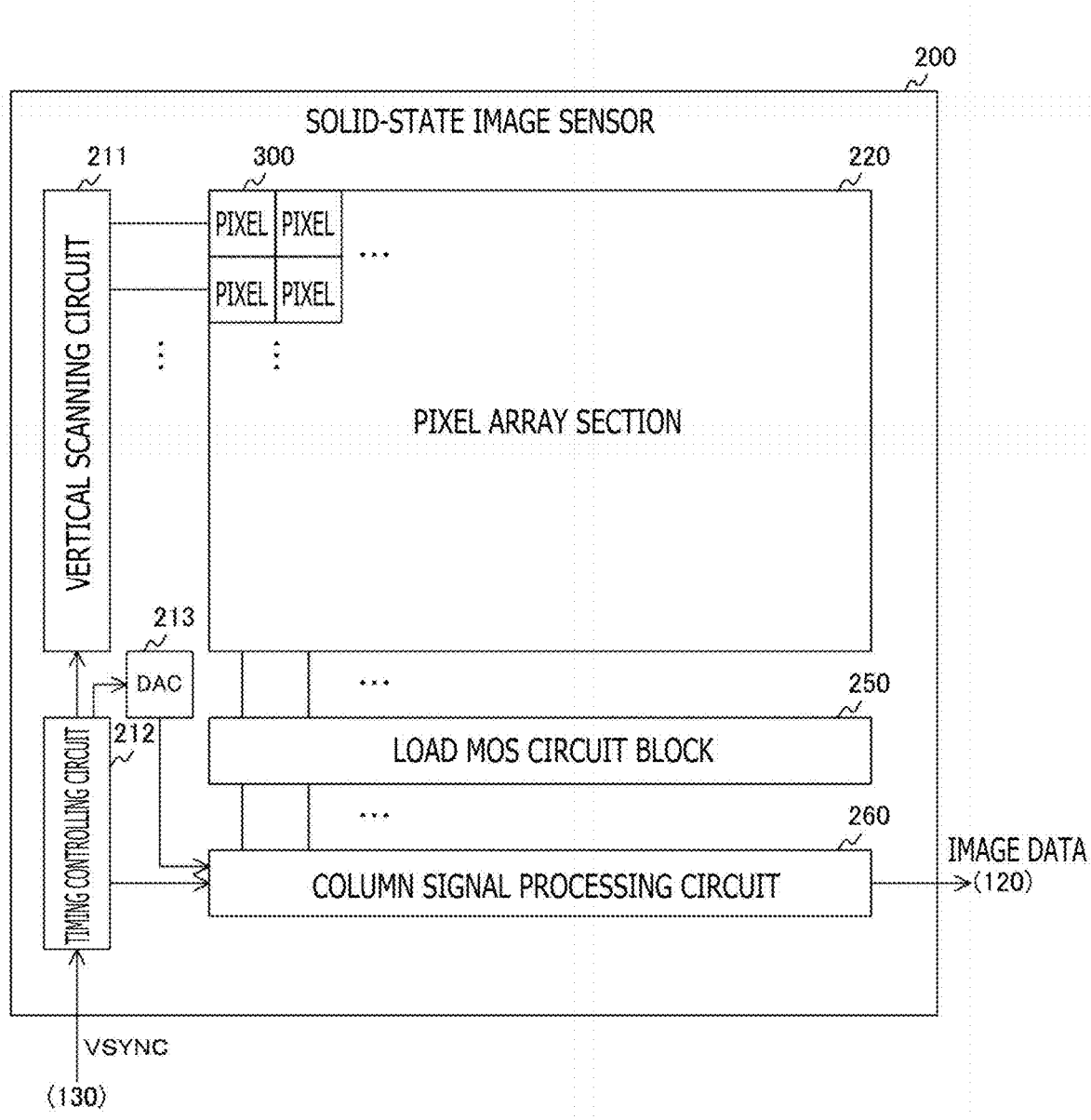

F I G . 4
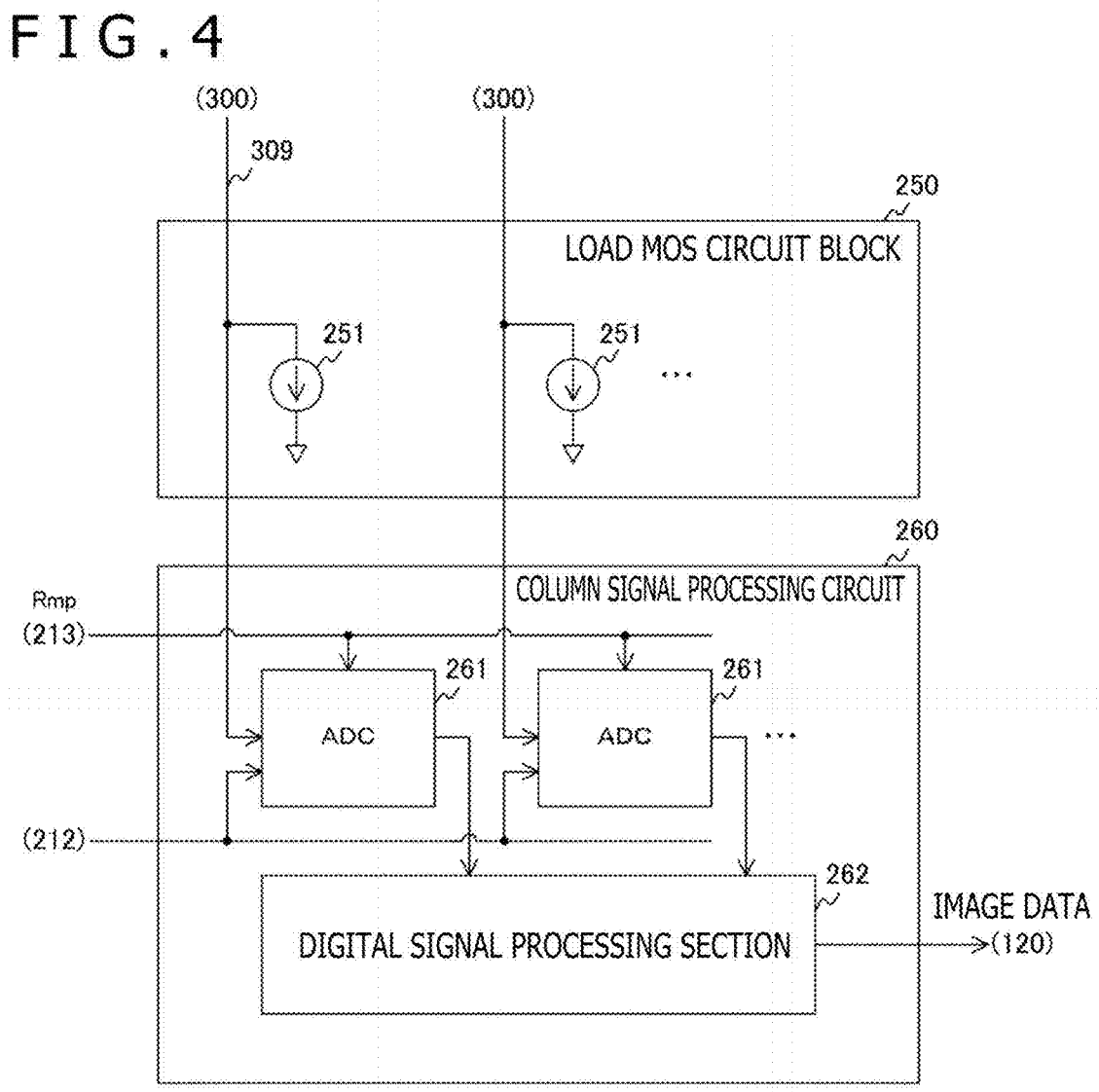

F I G . 3 7
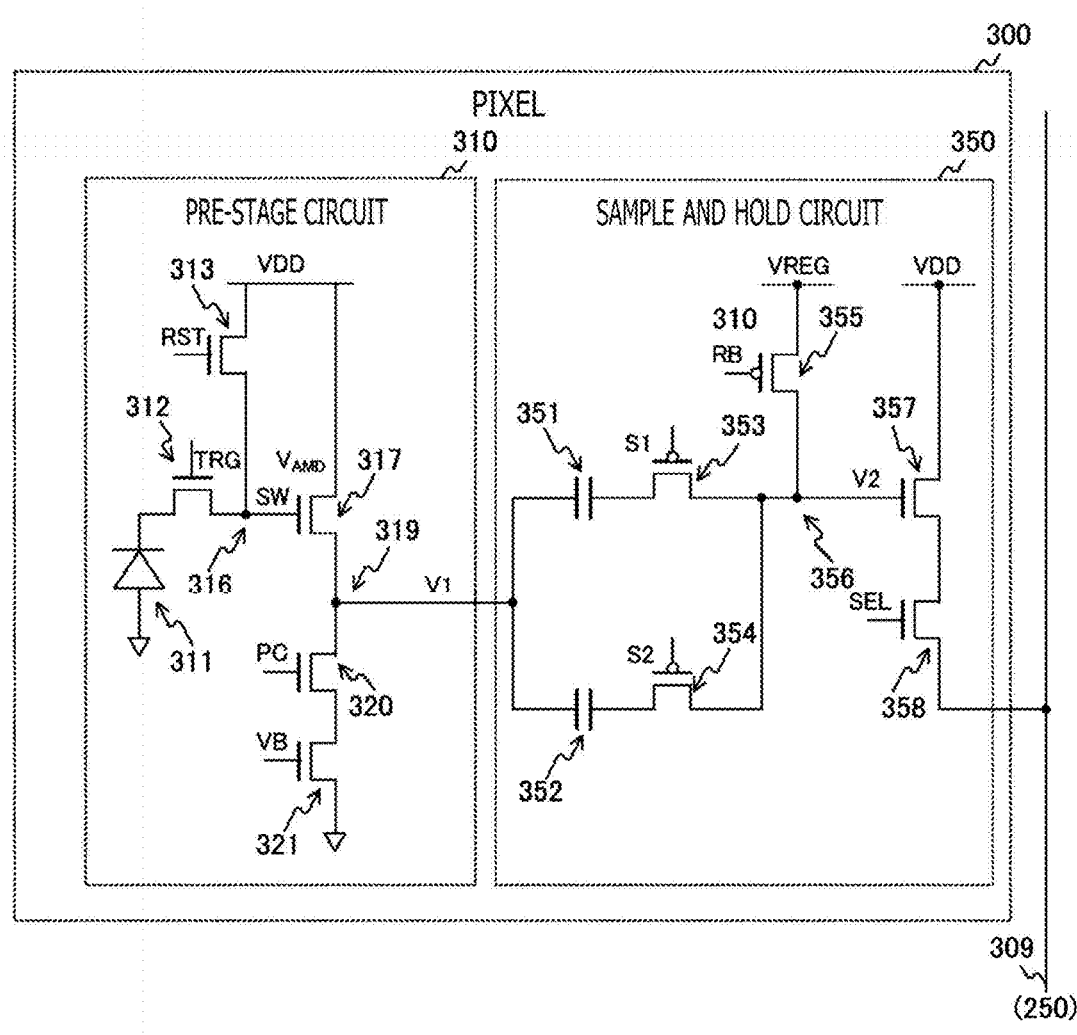

F I G . 4 0
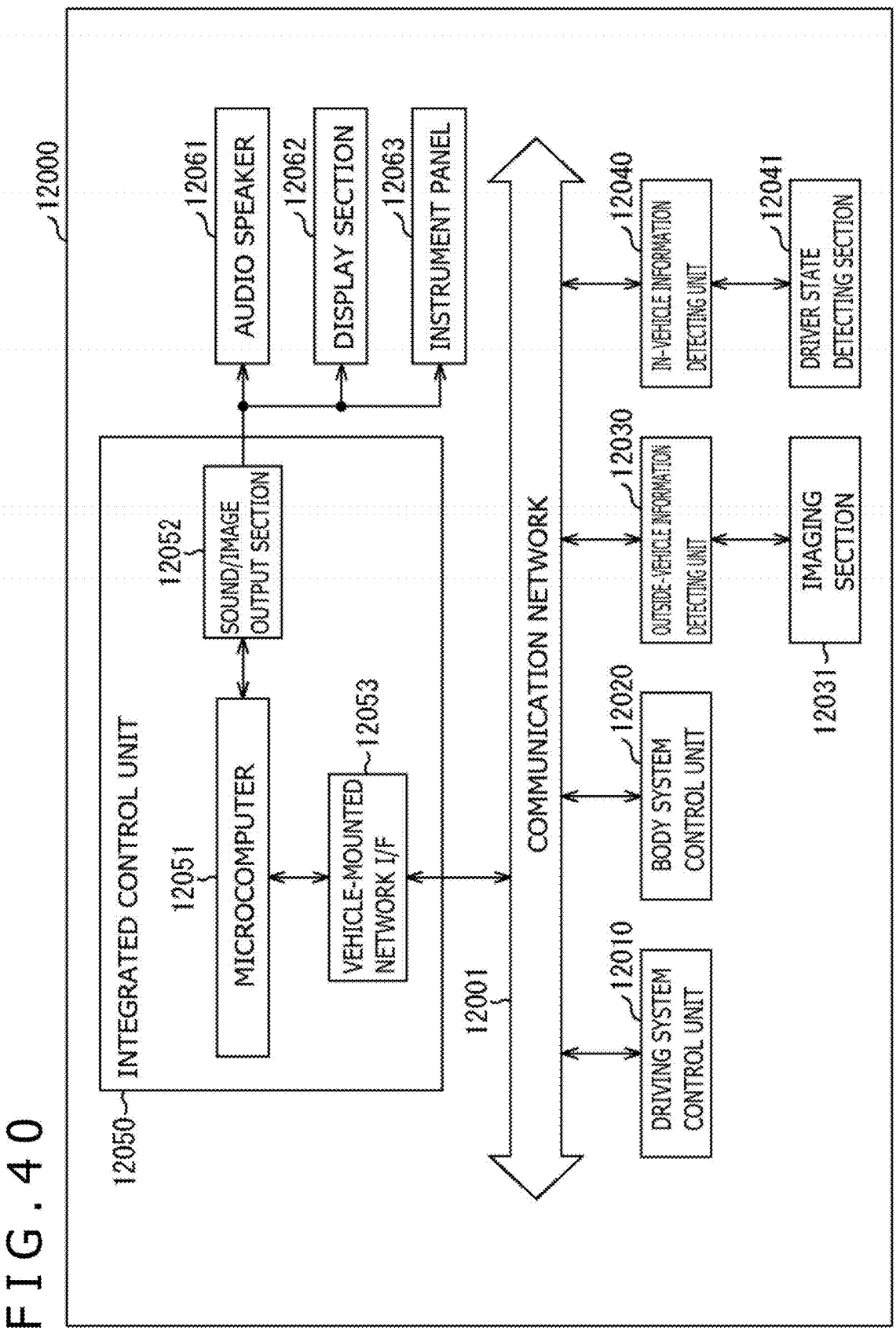

SOLID-STATE IMAGE SENSOR, IMAGING APPARATUS, AND CONTROL METHOD FOR SOLID-STATE IMAGE SENSOR

CROSS REFERENCE TO RELATED APPLICATIONS

This application is a U.S. National Phase of International Patent Application No. PCT/JP2022/034705 filed on Sep. 16, 2022, which claims priority benefit of Japanese Patent Application No. JP 2021-170376 filed in the Japan Patent Office on Oct. 18, 2021, which claims priority benefit of Japanese Patent Application No. JP 2021-175889 filed in the Japan Patent Office on Oct. 27, 2021. Each of the above-referenced applications is hereby incorporated herein by reference in its entirety.

TECHNICAL FIELD

The present technology relates to a solid-state image sensor. Particularly, the present technology relates to a solid-state image sensor of the global shutter type, an imaging apparatus, and a control method for the solid-state image sensor.

BACKGROUND ART

In the past, in the CIS (CMOS Image Sensor), used is a global shutter system in which all pixels are exposed to light at the same time in order to suppress rolling shutter distortion. Although, with a charge domain system in which an analog memory for retaining charge is provided for each pixel, the global shutter method can be implemented, the PLS (Parasitic Light Sensitivity) characteristic and so forth degrade. Hence, there has been proposed a solid-state image sensor which uses a voltage domain system by which a capacitive element is provided for each pixel such that a voltage is sampled and held in the capacitive element (for example, refer to NPL 1).

CITATION LIST

Non Patent Literature

[NPL 1]
Geunsook Park, et al., A 2.2 µm stacked back side illuminated voltage domain global shutter CMOS image sensor, IEDM 2019.

SUMMARY

Technical Problem

In the prior art described above, improvement of the PLS characteristic and so forth is achieved by use of the voltage domain system. However, the voltage domain system described above has such a problem that switching noise (in other words, kTC noise) is generated when a voltage is sampled and held in a capacitive element and the picture quality is deteriorated by the noise.

The present technology has been made in view of such a situation as described above, and it is an object of the present technology to improve the picture quality in a solid-state image sensor of the voltage domain system.

Solution to Problem

The present technology has been made in order to solve the problem described above, and the first aspect of the present technology resides in a solid-state image sensor including a transfer transistor that transfers charge from a photoelectric conversion element to a floating diffusion layer, a reset transistor that initializes the floating diffusion layer, a pre-stage amplification transistor that amplifies and outputs a voltage of the floating diffusion layer, a plurality of capacitive elements that hold the outputted voltage, and a vertical scanning circuit that performs soft reset of the pre-stage amplification transistor when a reset level that is the voltage when the floating diffusion layer is initialized is to be held in any one of the plurality of capacitive elements, and a control method for the solid-state image sensor. This brings about an effect that noise is reduced.

Further, in the first aspect, a transfer signal may be inputted to a gate of the transfer transistor, a reset signal may be inputted to a gate of the reset transistor, the transfer signal and the reset signal may be controlled to any one of a high level, a middle level lower than the high level, and a low level lower than the middle level, and the vertical scanning circuit may control, when the reset level is to be held, the transfer signal and the reset signal from the middle level to the low level and control the transfer signal and the reset signal from the low level to the middle level immediately before the charge is transferred. This brings about an effect that missing of information concerning the reset level is prevented.

Further, in the first aspect, the solid-state image sensor may further include a plurality of selection transistors that connect one end of any one of the plurality of capacitive elements to a post-stage node, and a post-stage reset transistor that initializes the post-stage node, the other ends of the plurality of capacitive elements may be connected in common to a pre-stage node to which the voltage is inputted, and when the reset level is to be held, the vertical scanning circuit may control the post-stage reset transistor to an on state and perform soft reset of the pre-stage amplification transistor. This brings about an effect that a voltage is held in each of the plurality of capacitive elements.

Further, in the first aspect, the plurality of selection transistors may be pMOS (p-channel Metal Oxide Semiconductor) transistors. This brings about an effect that missing of charge from the capacitive elements is prevented.

Further, in the first aspect, the post-stage reset transistor may be a pMOS transistor. This brings about an effect that missing of charge from the capacitive elements is prevented.

Further, in the first aspect, the solid-state image sensor may further include a switching transistor that opens and closes between a source of the pre-stage amplification transistor and the pre-stage node, and a precharge transistor that opens and closes a path between the pre-stage node and a predetermined current source. This brings about an effect that charge is prevented from being extracted from the capacitive element by the current source.

Further, in the first aspect, the transfer transistor, the reset transistor, and the pre-stage amplification transistor may be arranged on a first semiconductor chip, and the plurality of capacitive elements and the vertical scanning circuit may be arranged on a second semiconductor chip. This brings about an effect that refinement of the pixels is facilitated.

Further, in the first aspect, the solid-state image sensor may further include a conversion efficiency controlling transistor that controls charge-voltage conversion efficiency of the floating diffusion layer. This brings about an effect that the conversion efficiency is switched.

Further, in the first aspect, the solid-state image sensor may further include a selector that supplies one of a predetermined power supply voltage and a voltage different from the power supply voltage to a drain of the pre-stage ampli-fication transistor. This brings about an effect that noise is further reduced.

Further, the second aspect of the present technology resides in an imaging apparatus including a transfer transis-tor that transfers charge from a photoelectric conversion element to a floating diffusion layer, a reset transistor that initializes the floating diffusion layer, a pre-stage amplifi-cation transistor that amplifies and outputs a voltage of the floating diffusion layer, a plurality of capacitive elements that hold the outputted voltage, a vertical scanning circuit that performs soft reset on the pre-stage amplification tran-sistor when a reset level that is the voltage when the floating diffusion layer is initialized is to be held in any one of the plurality of capacitive elements, and a signal processing section that converts the voltage into a digital signal. This brings about an effect that the picture quality of image data is improved.

BRIEF DESCRIPTION OF DRAWINGS

FIG. 2 is a block diagram depicting an example of a configuration of a solid-state image sensor in the first embodiment of the present technology.

FIG. 4 is a block diagram depicting an example of a configuration of a load MOS (Metal-Oxide-Semiconductor) circuit block and a column signal processing circuit in the first embodiment of the present technology.

FIG. 37 is a circuit diagram depicting an example of a pixel of a minimum configuration in the first embodiment of the present technology.

FIG. 40 is a block diagram depicting an example of schematic configuration of a vehicle control system.

DESCRIPTION OF EMBODIMENTS

In the following, modes for carrying out the present technology (hereinafter referred to as embodiments) are described. Description is given in the following order.

1. First Embodiment (example in which a pre-stage amplification transistor is subjected to soft reset)
2. Second Embodiment (example in which a stacked structure is applied and a pre-stage amplification transistor is subjected to soft reset)
3. Example of Application to Moving Body

1. First Embodiment

[Example of Configuration of Imaging Apparatus]

Figure 1:
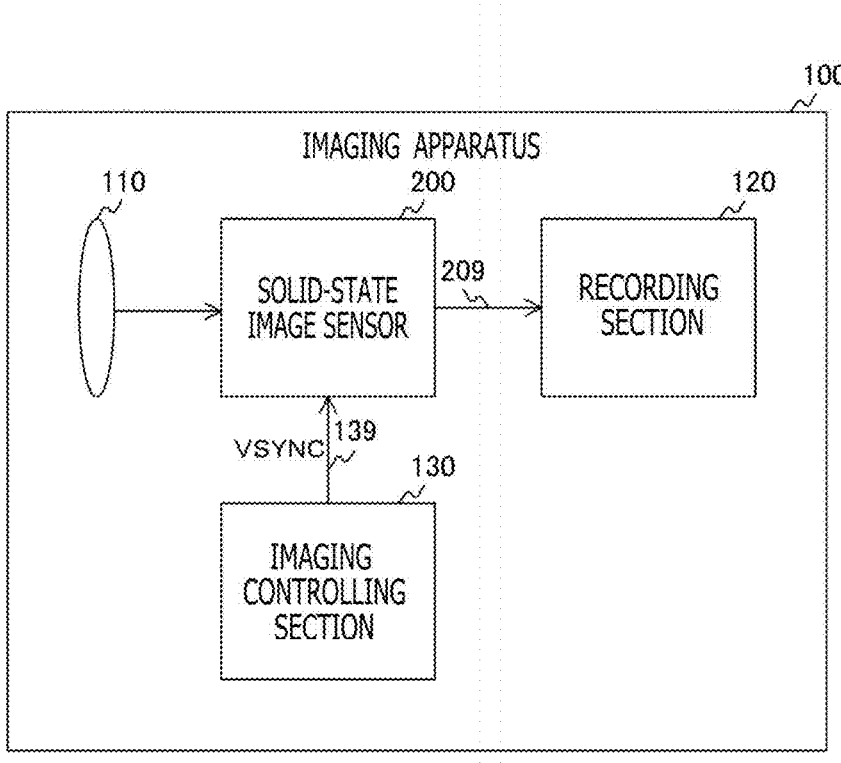
FIG. 1 is a block diagram depicting an example of a configuration of an imaging apparatus in a first embodiment of the present technology.

FIG. 1 is a block diagram depicting an example of a configuration of an imaging apparatus 100 according to a first embodiment of the present technology. The imaging apparatus 100 is an apparatus that captures an image of image data, and includes an imaging lens 110, a solid-state image sensor 200, a recording section 120, and an imaging controlling section 130. As the imaging apparatus 100, a digital camera and an electronic apparatus that has an imaging function (such as a smartphone or a personal computer) are assumed.

The solid-state image sensor 200 captures an image of image data under the control of the imaging controlling section 130. The solid-state image sensor 200 supplies the image data to the recording section 120 through a signal line 209.

The imaging lens 110 condenses and introduces light to the solid-state image sensor 200. The imaging controlling section 130 controls the solid-state image sensor 200 to capture an image of image data. The imaging controlling section 130 supplies, for example, an imaging controlling signal including a vertical synchronizing signal VSYNC to the solid-state image sensor 200 through a signal line 139. The recording section 120 records the image data.

Here, the vertical synchronizing signal VSYNC is a signal indicative of a timing of imaging, and a periodic signal of a fixed frequency (60 Hz or the like) is used as the vertical synchronizing signal VSYNC.

It is to be noted that, although the imaging apparatus 100 records image data, the image data may be transmitted to the outside of the imaging apparatus 100. In this case, an external interface for transmitting the image data is further provided. Alternatively, the imaging apparatus 100 may further display the image data. In this case, a display section is further provided.

[Example of Configuration of Solid-State Image Sensor]

FIG. 2 is a block diagram depicting an example of a configuration of the solid-state image sensor 200 in the first embodiment of the present technology. The solid-state image sensor 200 includes a vertical scanning circuit 211, a pixel array section 220, a timing controlling circuit 212, a DAC (Digital to Analog Converter) 213, a load MOS circuit block 250, and a column signal processing circuit 260. A plurality of pixels 300 are arrayed in a form of a two-dimensional grid on the pixel array section 220. Further, the circuits in the solid-state image sensor 200 are provided, for example, on a single semiconductor chip.

In the following description, a set of pixels 300 arrayed in the horizontal direction is referred to as a "row," and a set of pixels 300 arrayed in a direction perpendicular to the row is referred to as a "column."

The timing controlling circuit 212 controls action timings of the vertical scanning circuit 211, the DAC 213, and the column signal processing circuit 260 in synchronism with the vertical synchronizing signal VSYNC from the imaging controlling section 130.

The DAC 213 generates a ramp signal in the form of a saw tooth wave by DA (Digital to Analog) conversion. The DAC 213 supplies the generated ramp signal to the column signal processing circuit 260.

The vertical scanning circuit 211 selects and drives the rows in order such that an analog pixel signal is outputted. The pixel 300 photoelectrically converts incident light to generate an analog pixel signal. The pixel 300 supplies the pixel signal to the column signal processing circuit 260 through the load MOS circuit block 250.

In the load MOS circuit block 250, MOS transistors that supply a fixed current are provided for each column.

The column signal processing circuit 260 executes such signal processing as an AD (Analog to Digital) conversion process and a CDS (Correlated Double Sampling) process for a pixel signal for each column. The column signal processing circuit 260 supplies image data configured including post-processing signals to the recording section 120.

[Example of Configuration of Pixel]

Figure 3:
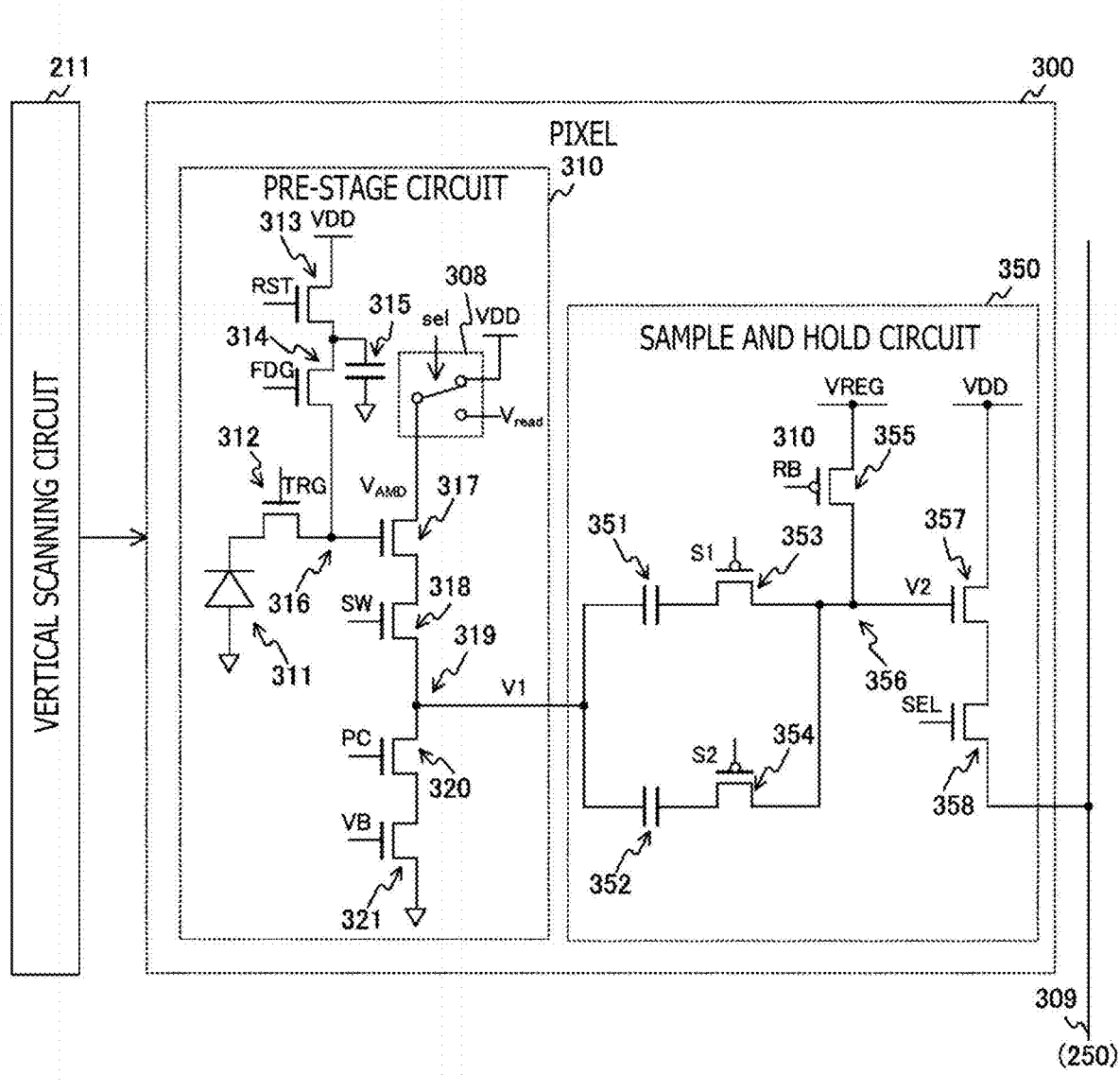
FIG. 3 is a circuit diagram depicting an example of a configuration of a pixel in the first embodiment of the present technology.

FIG. 3 is a circuit diagram depicting an example of a configuration of the pixel 300 in the first embodiment of the present technology. The pixel 300 includes a pre-stage circuit 310 and a sample and hold circuit 350. Further, in the pixel array section 220, a vertical signal line 309 is wired for each column.

The pre-stage circuit 310 includes a photoelectric conversion element 311, a transfer transistor 312, a reset transistor 313, a conversion efficiency controlling transistor 314, a capacitive element 315, and an FD (Floating Diffusion) 316. Further, the pre-stage circuit 310 includes a pre-stage amplification transistor 317, a selector 308, a switching transistor 318, a precharge transistor 320, and a current source transistor 321.

The photoelectric conversion element 311 photoelectrically converts incident light to generate charge. The transfer transistor 312 transfers the charge from the photoelectric conversion element 311 to the FD 316 according to a transfer signal TRG from the vertical scanning circuit 211. The reset transistor 313 initializes the FD 316 according to a reset signal RST from the vertical scanning circuit 211.

The conversion efficiency controlling transistor 314 controls the conversion efficiency in conversion of charge into a voltage, according to a control signal FDG from the vertical scanning circuit 211. In a case where the conversion efficiency controlling transistor 314 is in an on state, the capacitive element 315 is connected to the FD 316, and the conversion efficiency decreases. On the other hand, in a case where the conversion efficiency controlling transistor 314 is in an off state, charge is converted into a voltage only by the FD 316, and the conversion efficiency increases.

As the capacitive element 315, for example, an element of the MIM (Metal Insulator Metal) structure is used.

The FD 316 accumulates charge and generates a voltage according to the charge amount. The voltage when the FD 316 is initialized is hereinafter referred to as a "reset level," and the voltage when charge is transferred to the FD 316 is referred to as a "signal level."

The selector 308 selects one of a power supply voltage VDD and a voltage $V_{read}$ according to a selection signal sel from the vertical scanning circuit 211 and supplies the selected voltage as a drain voltage $V_{AMD}$ to a drain of the pre-stage amplification transistor 317. When the sample and hold circuit 350 is to sample and hold the voltage, the power supply voltage VDD is selected. On the other hand, when a voltage is to be read out from the sample and hold circuit 350 and AD converted for each row, the voltage $V_{read}$ is selected.

Here, the voltage $V_{read}$ is set to a value indicated by the following expression.

$$V_{read} = VDD - Vgs - Vft$$

In the expression above, Vgs is a gate-source voltage of the pre-stage amplification transistor 317. Vft is a fluctuation amount of the potential of the FD 316 by reset feedthrough of the reset transistor 313.

By the voltage being switched to the voltage $V_{read}$ when reading out is to be performed, the pre-stage amplification transistor 317 is placed into an on state, and by this, noise can be reduced.

The pre-stage amplification transistor 317 amplifies the voltage of the FD 316 and outputs the amplified voltage to the sample and hold circuit 350 through the switching transistor 318.

The switching transistor 318 opens or closes and clamps the path between a source of the pre-stage amplification transistor 317 and a pre-stage node 319 according to a control signal SW from the vertical scanning circuit 211. The potential of the pre-stage node 319 is represented by V1.

The precharge transistor 320 opens or closes the path between the pre-stage node 319 and the current source transistor 321 according to a control signal PC from the vertical scanning circuit 211.

The current source transistor 321 supplies a fixed current according to a bias voltage VB.

Meanwhile, the sample and hold circuit 350 includes capacitive elements 351 and 352, selection transistors 353 and 354, a post-stage reset transistor 355, a post-stage amplification transistor 357, and a selection transistor 358.

The capacitive elements 351 and 352 hold a voltage (of the reset level or signal level) outputted from the pre-stage circuit 310. For example, the capacitive element 351 holds the reset level, and the capacitive element 352 holds the signal level. For the capacitive elements, for example, an element of the MIM structure is used. Further, the capacitive elements 351 and 352 are connected at one end thereof in common to the pre-stage node 319.

The selection transistor 353 opens or closes the path between the other end of the capacitive element 351 and a post-stage node 356 according to a selection signal S1 from the vertical scanning circuit 211. The selection transistor 354 opens or closes the path between the other end of the capacitive element 352 and the post-stage node 356 according to a selection signal S2 from the vertical scanning circuit 211. The potential of the post-stage node 356 is represented by V2.

The post-stage reset transistor 355 initializes the voltage of the post-stage node 356 to predetermined potential VREG according to a post-stage reset signal RB from the vertical scanning circuit 211. For the potential VREG, potential different from the power supply voltage VDD (for example, potential lower than VDD) is set.

The post-stage amplification transistor 357 amplifies the voltage of the post-stage node 356. The selection transistor 358 outputs a signal of the voltage amplified by the post-stage amplification transistor 357 as a pixel signal to the vertical signal line 309 according to a selection signal SEL from the vertical scanning circuit 211.

Further, the vertical scanning circuit 211 controls the transfer signal TRG, the reset signal RST, and the control signal FDG to one of a high level, a middle level, and a low level. The high level is set to a value higher than "0" volt (V). The middle level is set lower than the high level and set, for example, to "0" volt (V). The low level is set lower than the middle level and set, for example, to "−1" volt (V). In particular, the transfer transistor 312, the reset transistor 313, and the conversion efficiency controlling transistor 314 corresponding to the signals are driven by three values.

When the reset level and the signal level are to be held by the capacitive element 351, the vertical scanning circuit 211 controls the transfer signal TRG, the reset signal RST, and the control signal FDG from the middle level to the low level. Consequently, the voltage of the FD 316 (that is, a gate of the pre-stage amplification transistor 317) drops, and the pre-stage amplification transistor 317 is subjected to soft reset. An effect produced by soft reset is described later.

Further, immediately before transfer of charge, the vertical scanning circuit 211 controls the transfer signal TRG, the reset signal RST, and the control signal FDG from the low level back to the middle level. An effect of driving the transfer transistor 312 and the reset transistor 313 by three values is described later.

Further, the selection transistor 353, the selection transistor 354, and the post-stage reset transistor 355 are, for example, pMOS (p-channel Metal Oxide Semiconductor) transistors. The other transistors such as the transfer transistor 312 are nMOS (n-channel MOS) transistors. An effect by configuring the selection transistor 353, the selection transistor 354, and the post-stage reset transistor 355 as pMOS transistors is described later.

[Example of Configuration of Column Signal Processing Circuit]

FIG. 4 is a block diagram depicting an example of a configuration of the load MOS circuit block 250 and the column signal processing circuit 260 in the first embodiment of the present technology.

In the load MOS circuit block 250, the vertical signal line 309 is wired for each column. When the number of columns is I (I is an integer), I vertical signal lines 309 are wired. Further, to each of the vertical signal lines 309, a load MOS transistor 251 that supplies a fixed current id2 is connected.

In the column signal processing circuit 260, a plurality of ADCs (Analog to Digital Converters) 261 and a digital signal processing section 262 are arranged. The ADC 261 is arranged for each column. When the number of columns is I, I ADCs 261 are arranged.

The ADC 261 converts an analog pixel signal from a corresponding column into a digital signal by using a ramp signal Rmp from the DAC 213. The ADC 261 supplies the digital signal to the digital signal processing section 262. For example, as the ADC 261, an ADC of the single slope type including a comparator and a counter is arranged.

The digital signal processing section 262 performs predetermined signal processing such as a CDS process for each of digital signals from the individual columns. The digital signal processing section 262 supplies image data including the post-processing digital signal to the recording section 120.

[Example of Action of Solid-State Image Sensor]

Figure 5:
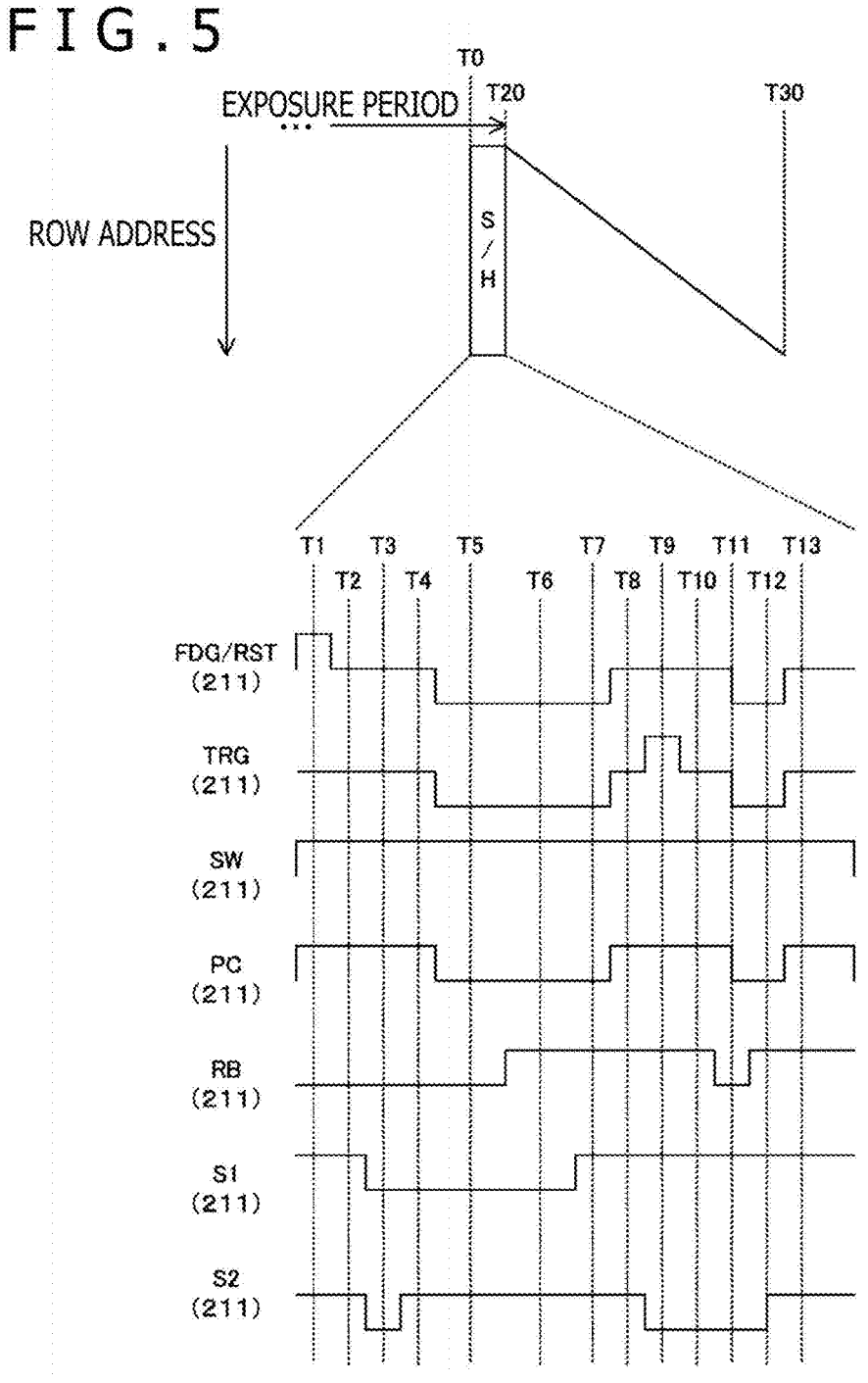
FIG. 5 is a timing chart depicting an example of action of the solid-state image sensor in the first embodiment of the present technology.

FIG. 5 is a timing chart depicting an example of action of the solid-state image sensor 200 in the first embodiment of the present technology. The vertical scanning circuit 211 drives all pixels at the same time and starts exposure of them to light. In particular, the exposure is performed by a global shutter method. During a sample hold period from timing TO at an end of an exposure period to timing T20, the vertical scanning circuit 211 drives all pixels to hold voltages (of the reset level and the signal level). Further, during a readout period from timing T20 to timing T30, the vertical scanning circuit 211 drives the rows in order to execute readout and AD conversion of a voltage.

At timing T1 during the sample hold period, the vertical scanning circuit 211 controls the control signal FDG and the reset signal RST to the high level. At this time, the transfer signal TRG, the control signal SW, the control signal PC, the selection signal S1, and the selection signal S2 are controlled to the high level, and the post-stage reset signal RB is controlled to the low level. Consequently, the FD 316 and the potential V2 are initialized.

At timing T2, the vertical scanning circuit 211 controls the control signal FDG and the reset signal RST to the middle level. Consequently, the state of the reset level is fixed, and the pre-stage node 319 is placed into a potential state in which it is buffered by the pre-stage amplification transistor 317.

At timing T3, the vertical scanning circuit 211 controls the selection signals S1 and S2 to the low level and controls, at timing T4 immediately after the timing, the selection signal S2 back to the high level. Consequently, the reset level is sampled by the capacitive element 351.

Then at timing T5, the vertical scanning circuit 211 controls the transfer signal TRG, the reset signal RST, and the control signal FDG from the middle level to the low level and controls the control signal PC from the high level to the low level. Consequently, the voltage of the FD 316 (the gate of the pre-stage amplification transistor 317) drops, and the pre-stage amplification transistor 317 is subjected to soft reset, so that the reset level is held by the capacitive element 351.

At timing T6, the vertical scanning circuit 211 controls the post-stage reset signal RB to the high level. Consequently, also the post-stage reset transistor 355 on the right side of the capacitive element 351 is turned off.

At timing T7, the vertical scanning circuit 211 controls the selection signal S1 to the high level. Consequently, also the selection transistor 353 is placed into an off state.

At timing T8, the vertical scanning circuit 211 controls the transfer signal TRG, the reset signal RST, and the control signal FDG back to the middle level and controls the control signal PC back to the high level. Consequently, it is possible to recover the charge lost at timing T5 and prevent missing of the information concerning the reset level.

At timing T9, the vertical scanning circuit 211 controls the transfer signal TRG to the high level and controls the selection signal S2 to the low level. Consequently, the charge is transferred to the FD 316. At timing T10, the vertical scanning circuit 211 controls the transfer signal TRG to the middle level. Consequently, the signal level is sampled by the capacitive element 352.

At timing T11, the vertical scanning circuit 211 controls the post-stage reset signal RB to the low level and controls, immediately after this, the transfer signal TRG, the reset signal RST, the control signal FDG, and the control signal PC to the low level. Consequently, the pre-stage amplification transistor 317 is subjected to soft reset again. At timing T12, the vertical scanning circuit 211 controls the post-stage reset signal RB back to the high level and controls, immediately after this, the selection signal S2 to the high level. Consequently, the post-stage node 356 is initialized.

At timing T13, the vertical scanning circuit 211 controls the transfer signal TRG, the reset signal RST, and the control signal FDG back to the middle level and controls the control signal PC back to the high level. Consequently, the selection transistor 354 is placed into an off state, and the signal level is held by the capacitive element 352.

During a subsequent readout period, the selection signals S1 and S2 are controlled to the high level in order, and the reset level and the signal level are read out in order.

It is to be noted that, although the vertical scanning circuit 211 controls the switching transistor 318 to remain in an on state during the sample hold period, this control is not restrictive.

Here, soft reset is described in comparison with hard reset.

Figures 6A, 6B, 6C, 6D:
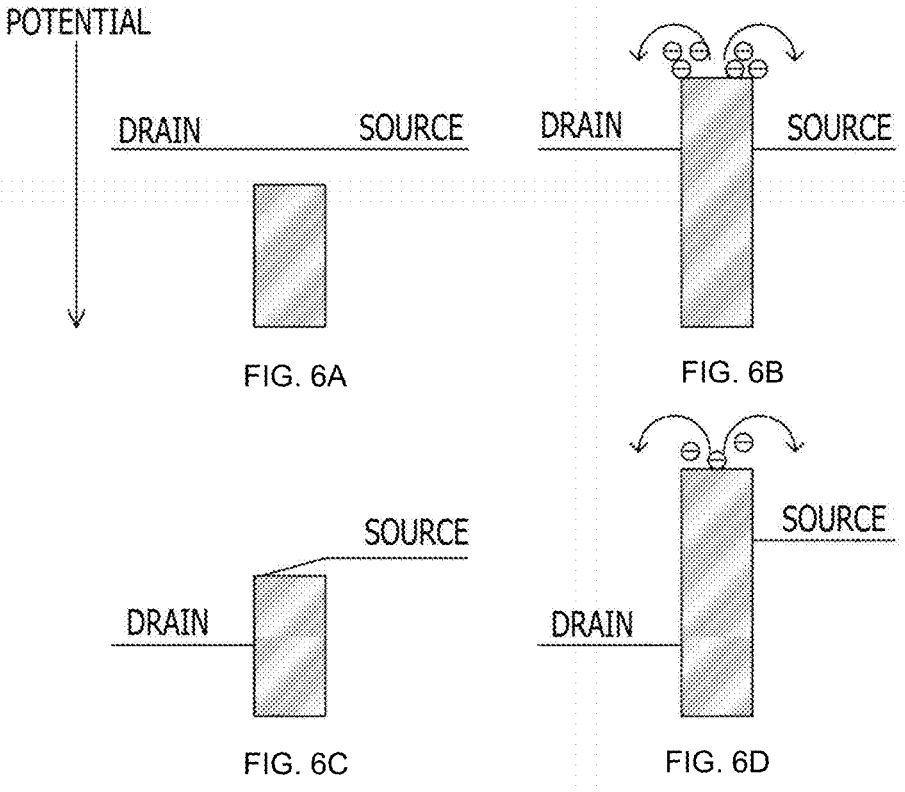
FIGS. 6A, 6B, 6C, and 6D are views illustrating soft reset and hard reset.

FIGS. 6A, 6B, 6C, and 6D are views illustrating soft reset and hard reset. In FIGS. 6A, 6B, 6C, and 6D, FIG. 6A is a potential diagram of an nMOS transistor before hard reset, and FIG. 6B is a potential diagram of the nMOS transistor at the time of hard reset. In FIGS. 6A, 6B, 6C, and 6D, FIG. 6A is a potential diagram of the nMOS transistor before soft reset, and FIG. 6D is a potential diagram of the nMOS transistor at the time of soft reset.

In a case where the gate voltage is changed from the high level to the low level in a state in which the voltages at the source and the drain are similar to each other as exemplified in FIGS. 6A and 6B, the nMOS transistor acts in a strong inversion state and is subjected to hard reset.

On the other hand, in a case where the source voltage is in a relatively low state with respect to the drain voltage as exemplified in FIG. 6C, the gate-source voltage is lower than that at the time of hard reset. Thus, the nMOS transistor acts in a weak inversion state and in a saturation region. At this time, the control for controlling the gate voltage to the low level to turn off the nMOS transistor as exemplified in FIG. 6D is called soft reset. Typically, in a case where a transistor is subjected to soft reset, kTC noise to be generated decreases and becomes 1/21/2 in comparison with that in a case where the transistor is subjected to hard reset.

Since the pre-stage amplification transistor 317 described hereinabove is a source follower circuit in which the drain is connected to the power supply side, the condition for soft reset is satisfied.

Figure 7A:
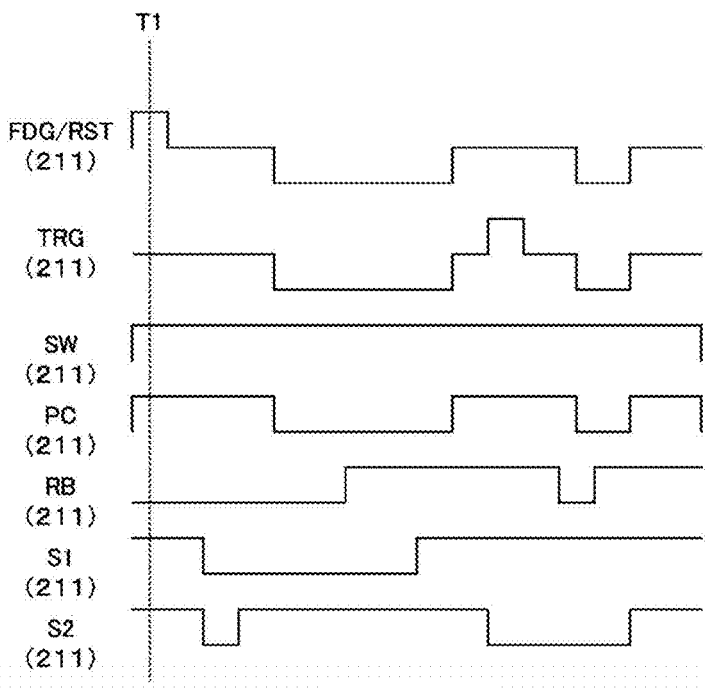
FIGS. 7A and 7B are examples of a potential diagram at timing T1 in the first embodiment of the present technology.
Figure 7B:
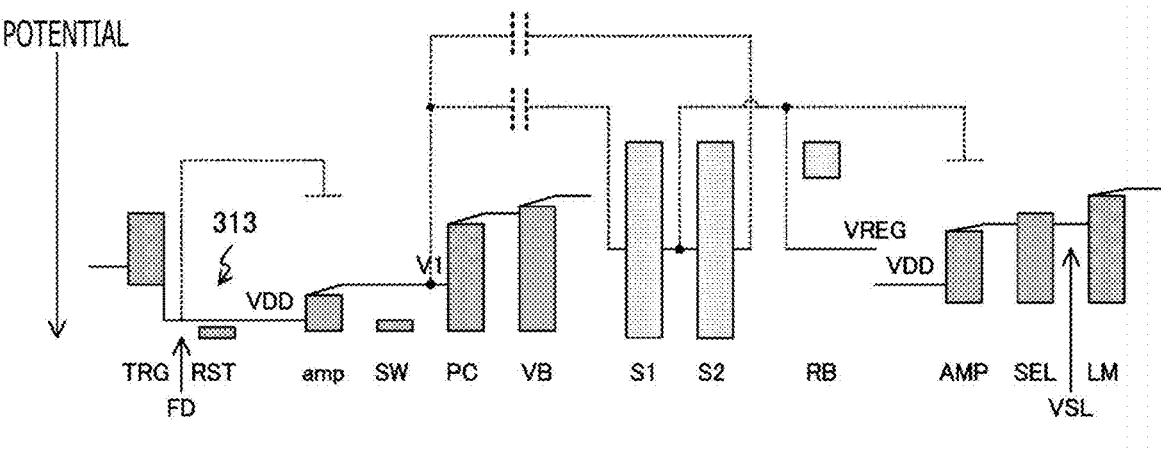

FIGS. 7A and 7B are examples of a potential diagram at timing T1 in the first embodiment of the present technology. In FIGS. 7A and 7B, FIG. 7A depicts a position of timing T1 in the timing chart, and FIG. 7B depicts a potential diagram at the timing.

In FIG. 7B, "amp" indicates the potential of the pre-stage amplification transistor 317. "AMP" indicates the potential of the post-stage amplification transistor 357. "VSL" indicates the potential of the vertical signal line 309, and "LM" indicates the potential of the load MOS transistor 251. Other "TRG" and so forth indicate the potential of a transistor corresponding to the control signal. It is to be noted, however, that the potential of the conversion efficiency controlling transistor 314 is omitted. This similarly applies also to potential diagrams hereinafter described.

As exemplified in FIG. 7B, the gate voltage of the reset transistor 313 is controlled to the high level.

Figures 8A, 8B:
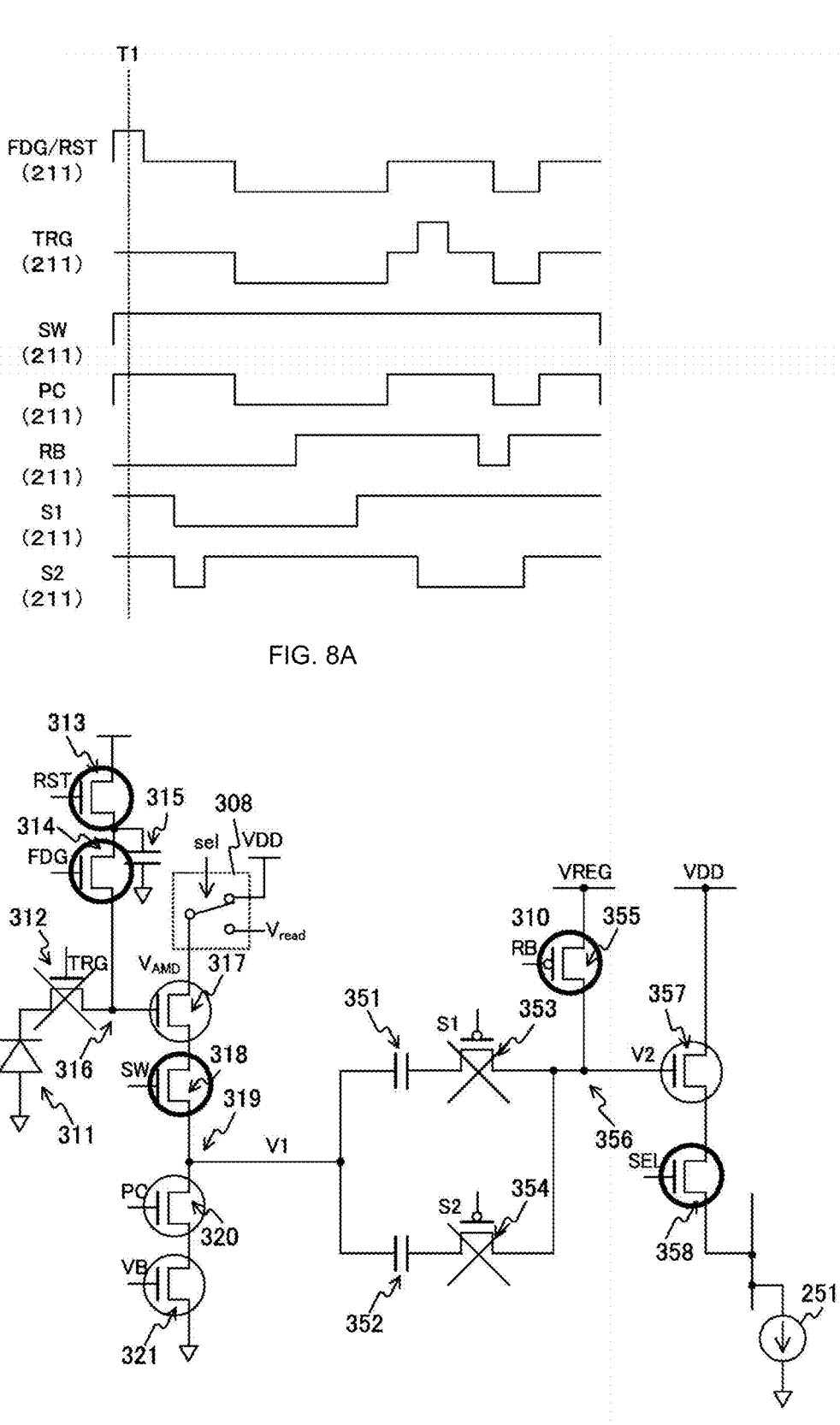
FIGS. 8A and 8B are views depicting an example of a circuit state at timing T1 in the first embodiment of the present technology.

FIGS. 8A and 8B are views depicting an example of a circuit state at timing T1 in the first embodiment of the present technology. In FIGS. 8A and 8B, FIG. 8A indicates a position of timing T1 in the timing chart, and FIG. 8B indicates a circuit state of the pixel 300 at the timing.

In FIG. 8B, "x" indicates that the transistor is in an off state. "○" indicates that the transistor is in an on state. Thick "○" indicates that the gate voltage has the low level, and thin "○" indicates that the gate voltage has the middle level. This also applies similarly to the diagrams of the circuit state hereinafter described.

As exemplified in FIG. 8B, the vertical scanning circuit 211 controls the reset transistor 313 and the conversion efficiency controlling transistor 314 to an on state. This initializes the FD 316.

Further, at this time, the transfer transistor 312, the selection transistor 353, and the selection transistor 354 are in the off state. The remaining transistors are in the on state.

Figures 9A, 9B:
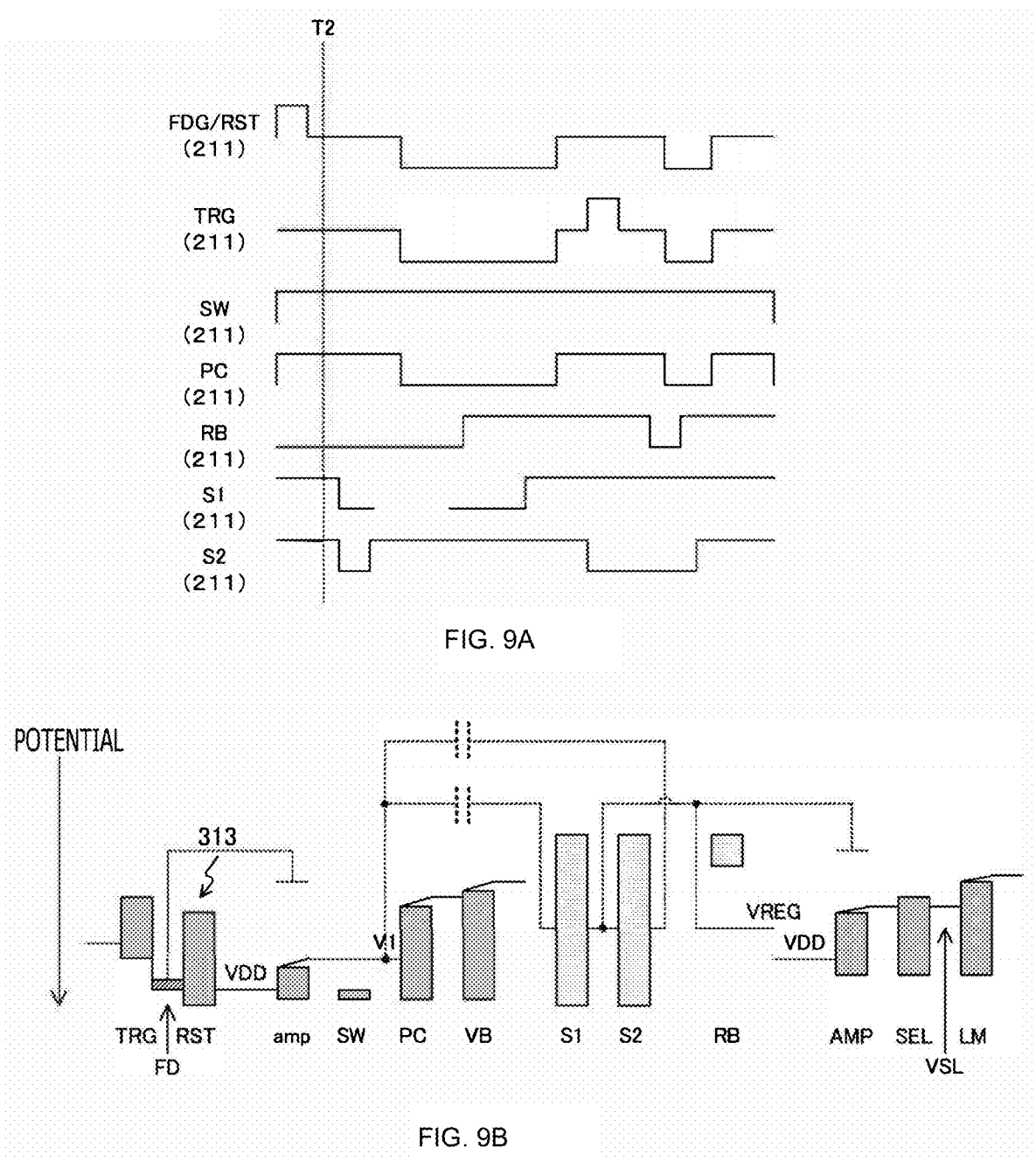
FIGS. 9A and 9B are examples of a potential diagram at timing T2 in the first embodiment of the present technology.

FIGS. 9A and 9B are examples of a potential diagram at timing T2 in the first embodiment of the present technology. In FIGS. 9A and 9B, FIG. 9A depicts the position of timing T2 in the timing chart, and FIG. 9B depicts a potential diagram at the timing.

As exemplified in FIG. 9B, the gate voltage of the reset transistor 313 is controlled to the middle level.

Figure 10A:
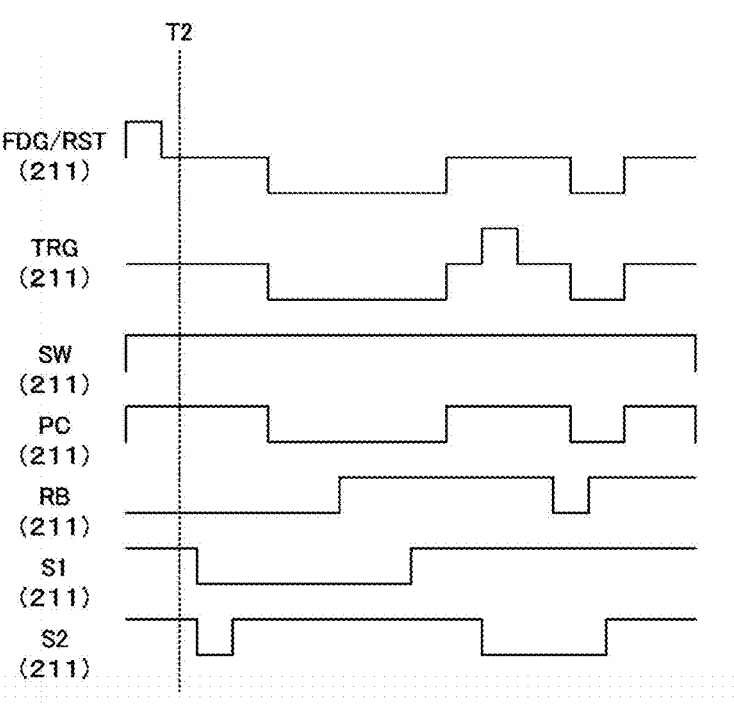
FIGS. 10A and 10B are views depicting an example of a circuit state at timing T2 in the first embodiment of the present technology.
Figure 10B:
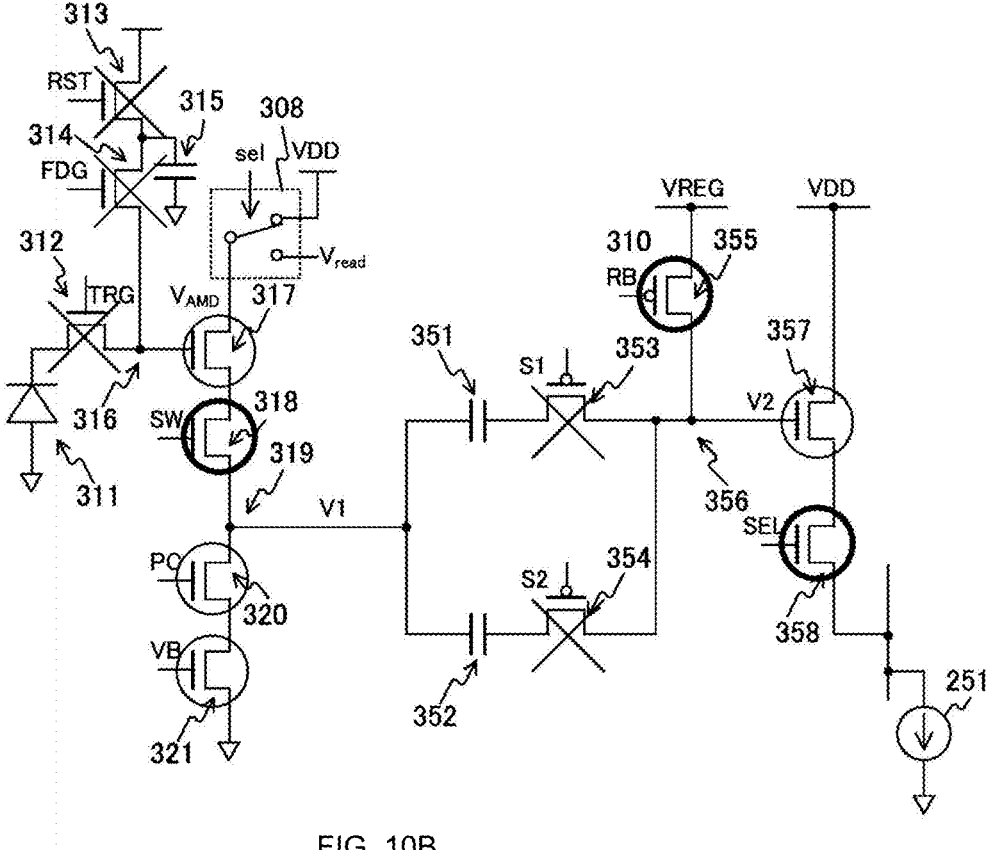

FIGS. 10A and 10B are views depicting an example of a circuit state at timing T2 in the first embodiment of the present technology. In FIGS. 10A and 10B, FIG. 10A depicts a position of timing T2 in the timing chart, and FIG. 10B depicts a circuit state of the pixel 300 at the timing.

As exemplified in FIG. 10B, the vertical scanning circuit 211 controls the reset transistor 313 and the conversion efficiency controlling transistor 314 to an off state at timing T2.

Figures 11A, 11B:
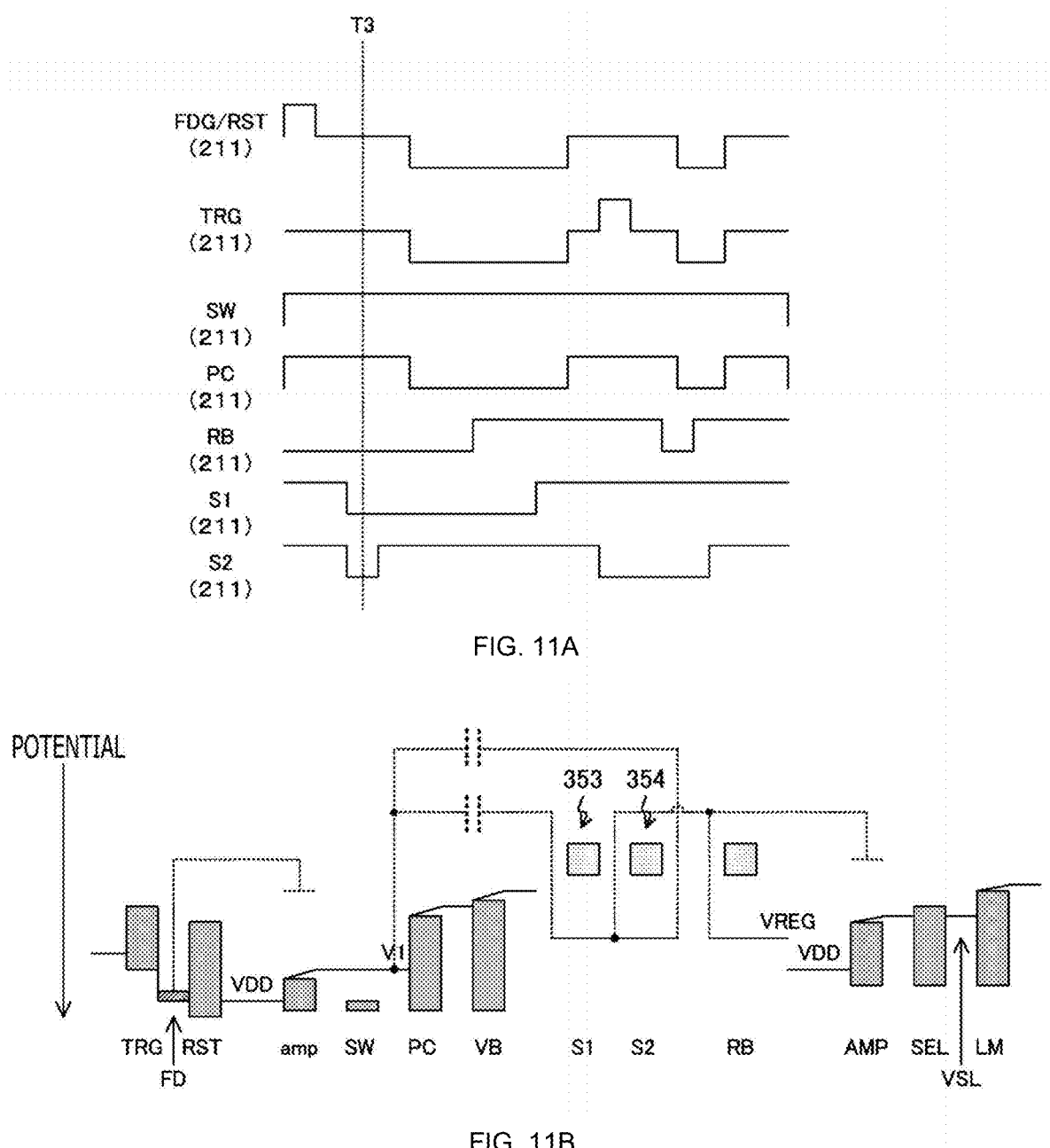
FIGS. 11A and 11B are examples of a potential diagram at timing T3 in the first embodiment of the present technol-ogy.

FIGS. 11A and 11B are examples of a potential diagram at timing T3 in the first embodiment of the present technology. In FIGS. 11A and 11B, FIG. 11A depicts a position of timing T3 in the timing chart, and FIG. 11B depicts a potential diagram at the timing.

As exemplified in FIG. 11B, the gate voltage of the selection transistors 353 and 354 is controlled to the low level.

Figure 12A:
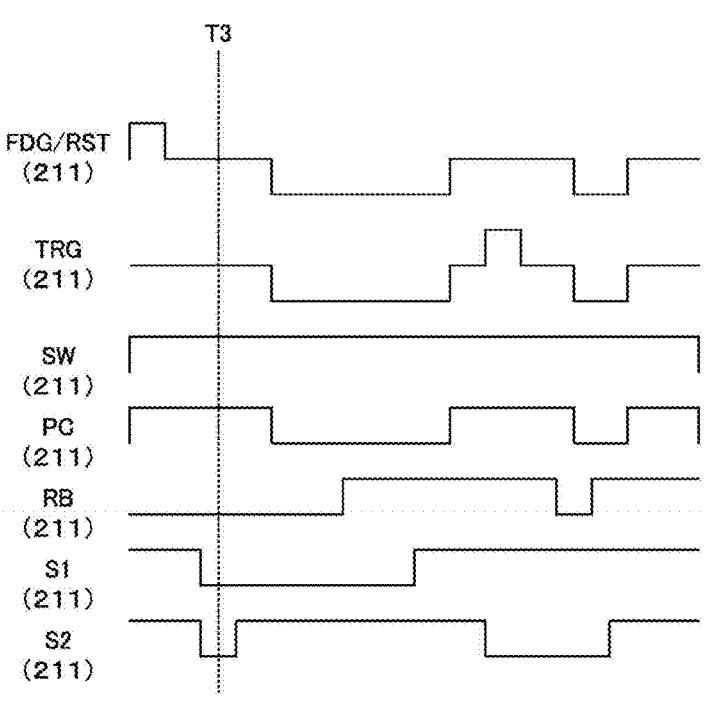
FIGS. 12A and 12B are views depicting an example of a circuit state at timing T3 in the first embodiment of the present technology.
Figure 12B:
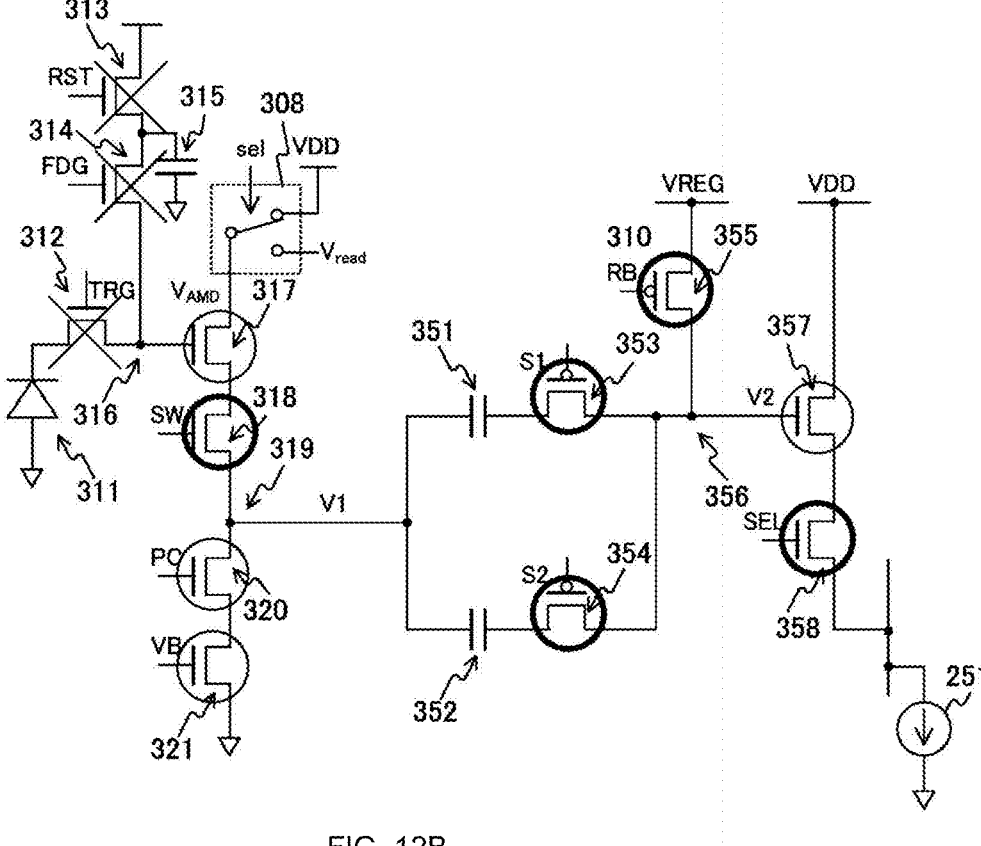

FIGS. 12A and 12B are views depicting an example of a circuit state at timing T3 in the first embodiment of the present technology. In FIGS. 12A and 12B, FIG. 12A depicts a position of timing T3 in the timing chart, and FIG. 12B depicts a circuit state of the pixel 300 at the timing.

As exemplified in FIG. 12B, the vertical scanning circuit 211 controls both of the selection transistors 353 and 354 to an on state. Consequently, sampling of the reset level is started.

Figures 13A, 13B:
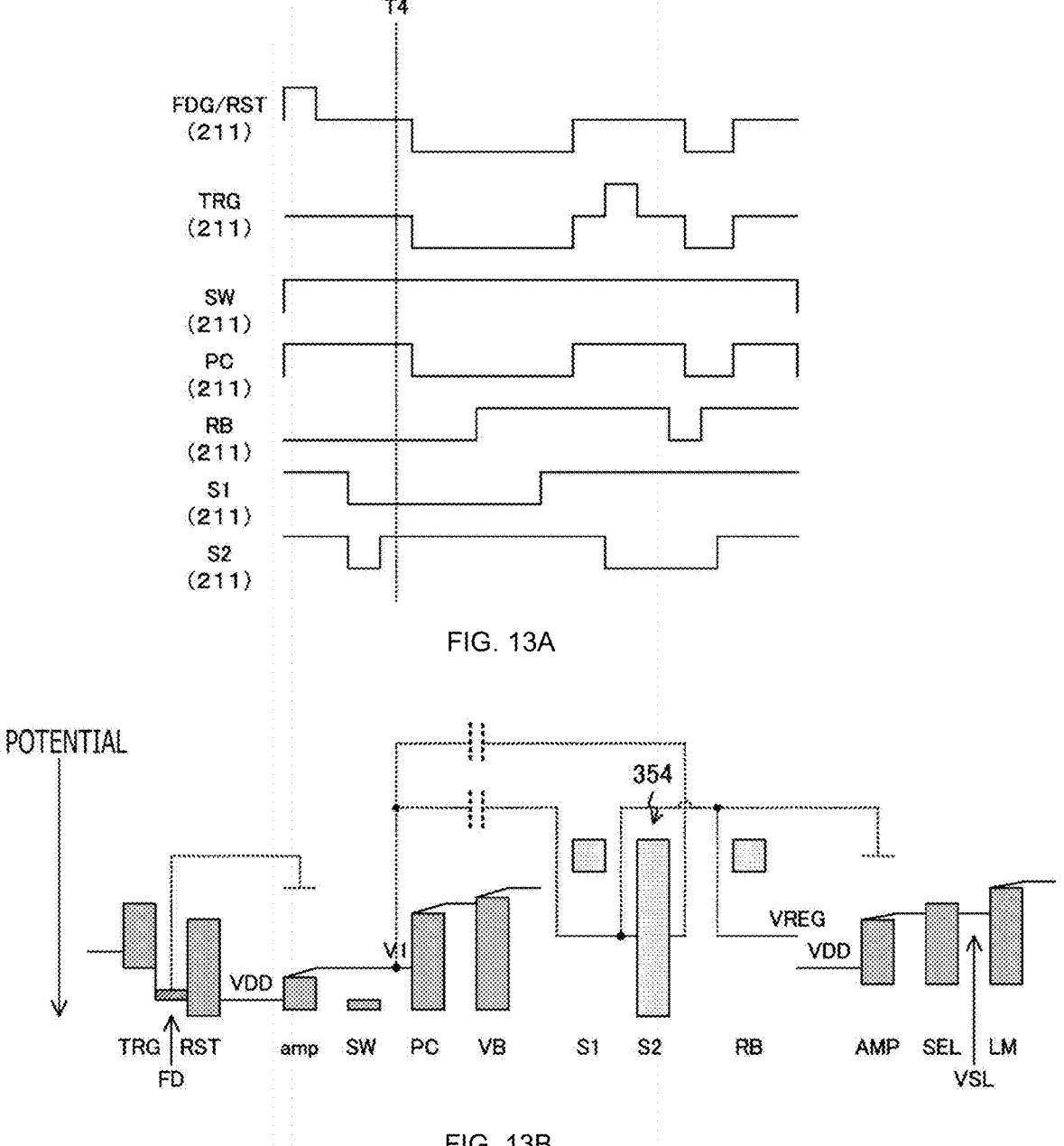
FIGS. 13A and 13B are examples of a potential diagram at timing T4 in the first embodiment of the present technol-ogy.

FIGS. 13A and 13B are examples of a potential diagram at timing T4 in the first embodiment of the present technology. In FIGS. 13A and 13B, FIG. 13A depicts a position of timing T4 in the timing chart, and FIG. 13B [b] depicts a potential diagram at the timing.

As exemplified in FIG. 13B, the gate voltage of the selection transistor 354 is controlled to the high level.

Figure 14A:
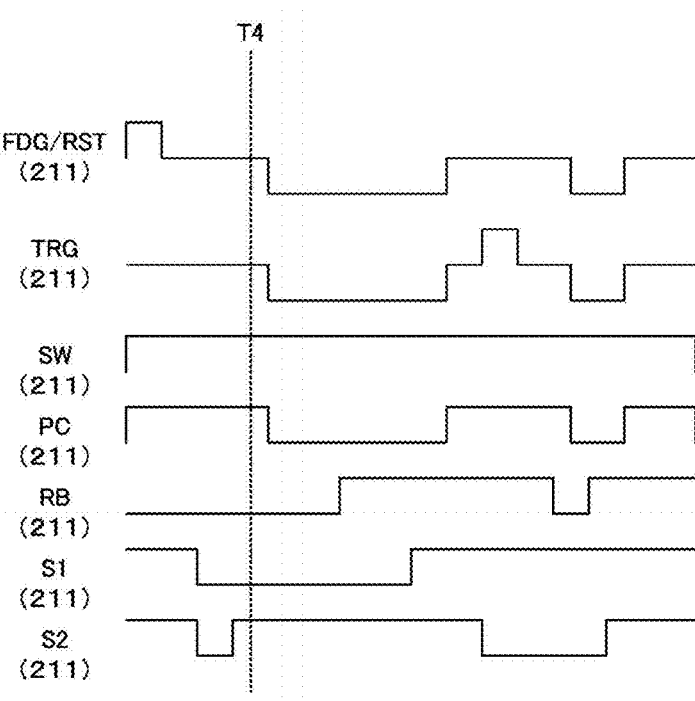
FIGS. 14A and 14B are views depicting an example of a circuit state at timing T4 in the first embodiment of the present technology.
Figure 14B:
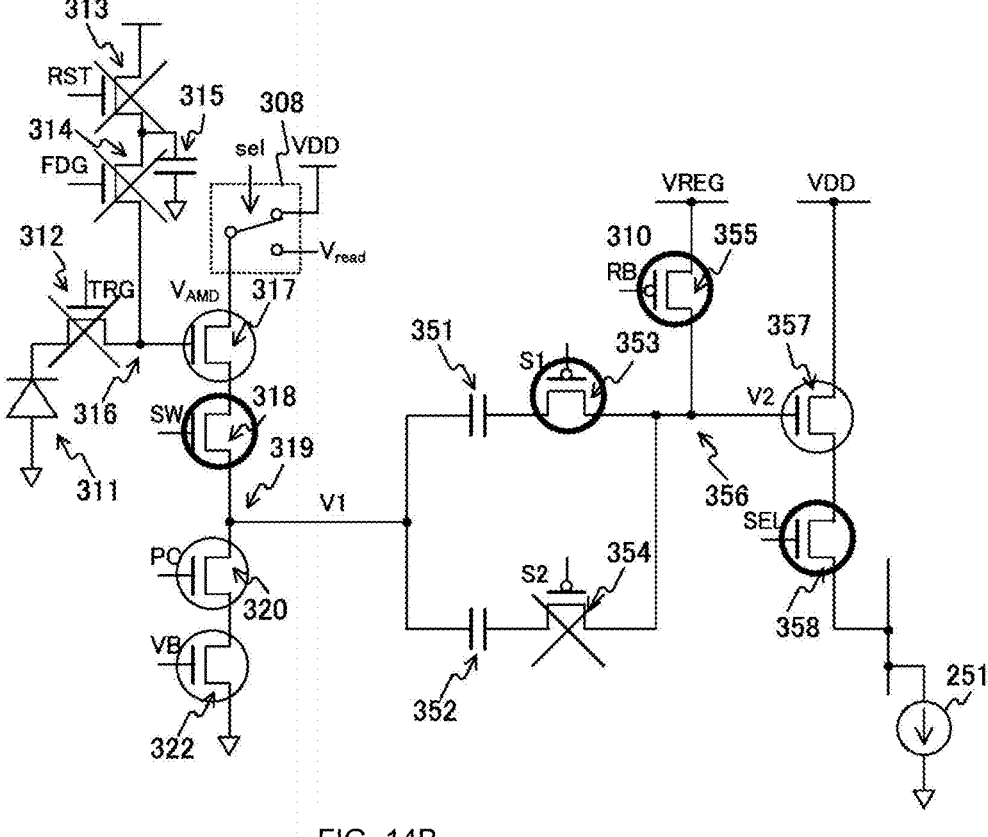

FIGS. 14A and 14B are views depicting an example of a circuit state at timing T4 in the first embodiment of the present technology. In FIGS. 14A and 14B, FIG. 14A depicts a position of timing T4 in the timing chart, and FIG. 14B depicts a circuit state of the pixel 300 at the timing.

As exemplified in FIG. 14B, the vertical scanning circuit 211 controls the selection transistor 354 to an off state. Consequently, the capacitive element 351 becomes the capacitive element whose reset level is to be sampled.

Figures 15A, 15B:
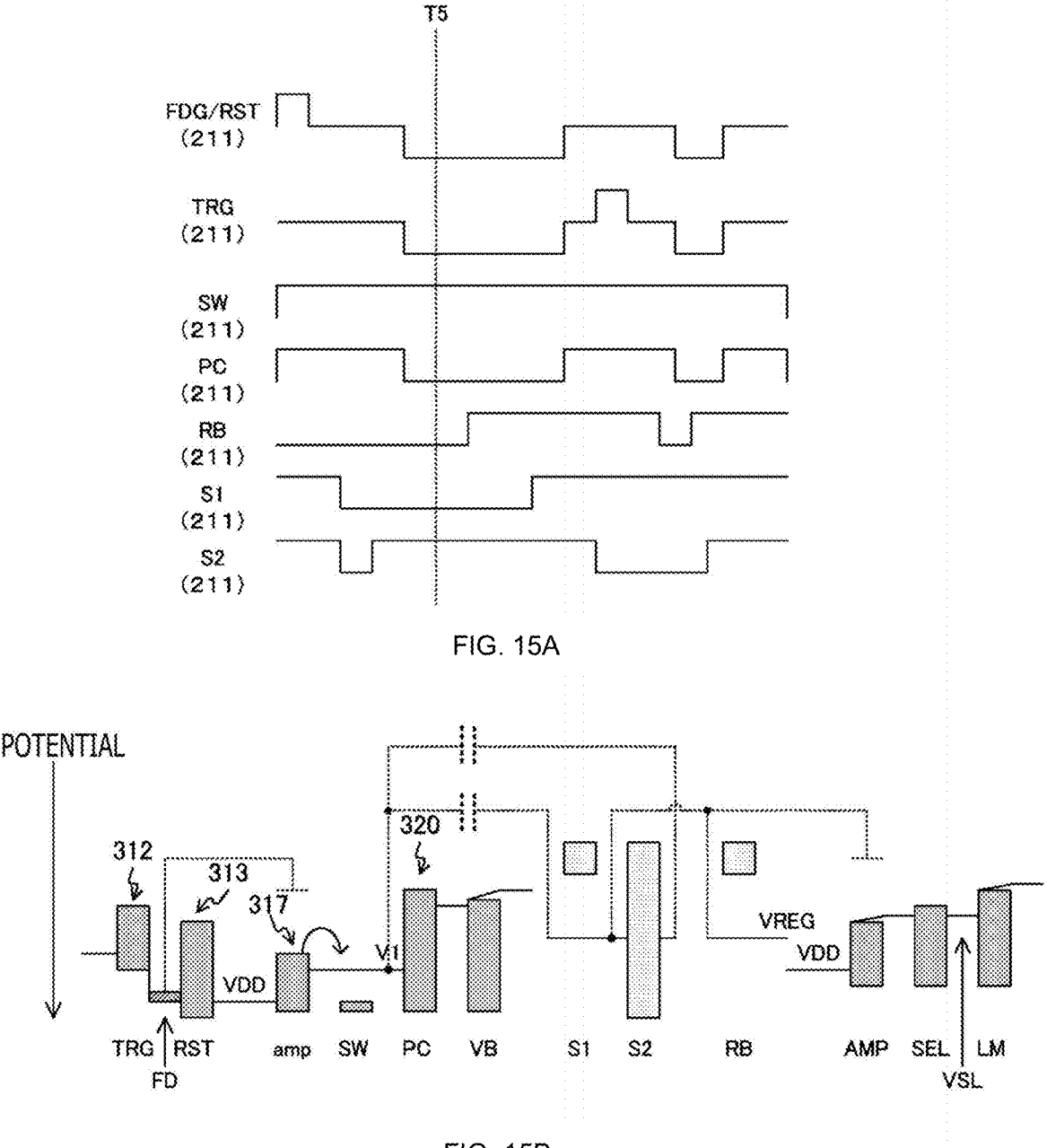
FIGS. 15A and 15B are examples of a potential diagram at timing T5 in the first embodiment of the present technol-ogy.

FIGS. 15A and 15B are examples of a potential diagram at timing T5 in the first embodiment of the present technology. In FIGS. 15A and 15B, FIG. 15A depicts a position of timing T5 in the timing chart, and FIG. 15B depicts a potential diagram at the timing.

As exemplified in FIG. 15B, the gate voltage of the transfer transistor 312 and the reset transistor 313 is controlled from the middle level to the low level. Consequently, the pre-stage amplification transistor 317 is subjected to soft reset, and the reset level is held in the capacitive element 351. At this time, although kTC noise is generated, the noise is decreased in comparison with that in a case where the transistor is subjected to hard reset as described hereinabove.

Figures 16A, 16B:
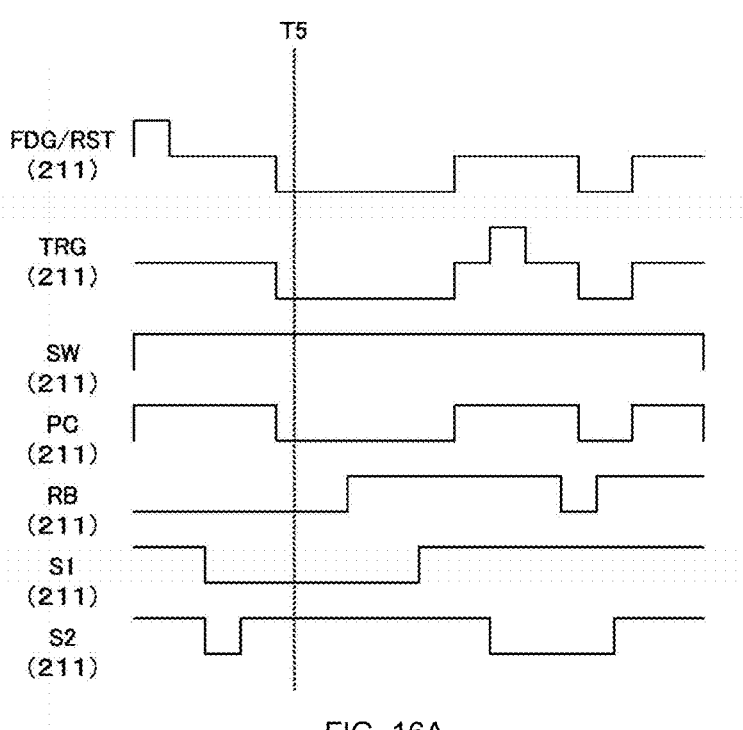
FIGS. 16A and 16B are views depicting an example of a circuit state at timing T5 in the first embodiment of the present technology.

FIGS. 16A and 16B are examples of a circuit state at timing T5 in the first embodiment of the present technology. In FIGS. 16A and 16B, FIG. 16A depicts a position of timing T5 in the timing chart, and FIG. 16B depicts a circuit state of the pixel 300 at the timing.

As exemplified in FIG. 16B, the vertical scanning circuit 211 performs soft reset on the pre-stage amplification transistor 317. At this time, the post-stage reset transistor 355 remains in the on state.

Further, the vertical scanning circuit 211 controls the precharge transistor 320 to an off state. Consequently, it is possible to prevent charge from being extracted from the capacitive elements 351 and 352 by the current source transistor 321.

Figures 17A, 17B:
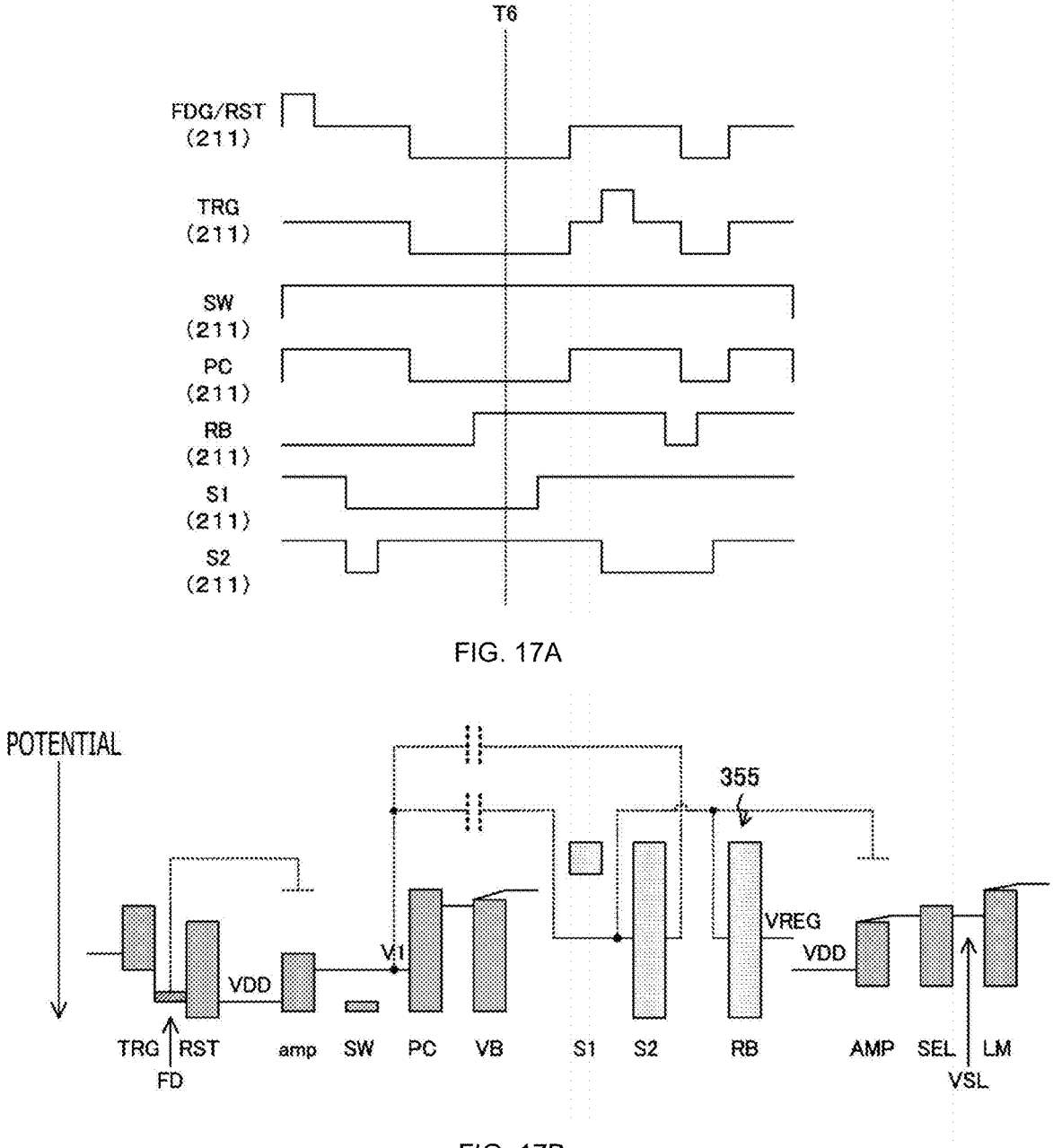
FIGS. 17A and 17B are examples of a potential diagram at timing T6 in the first embodiment of the present technol-ogy.

FIGS. 17A and 17B are examples of a potential diagram at timing T6 in the first embodiment of the present technology. In FIGS. 17A and 17B, FIG. 17A depicts a position of timing T6 in the timing chart, and FIG. 17B depicts a potential diagram at the timing.

As exemplified in FIG. 17B, the gate voltage of the post-stage reset transistor 355 is controlled to the high level.

Figure 18A:
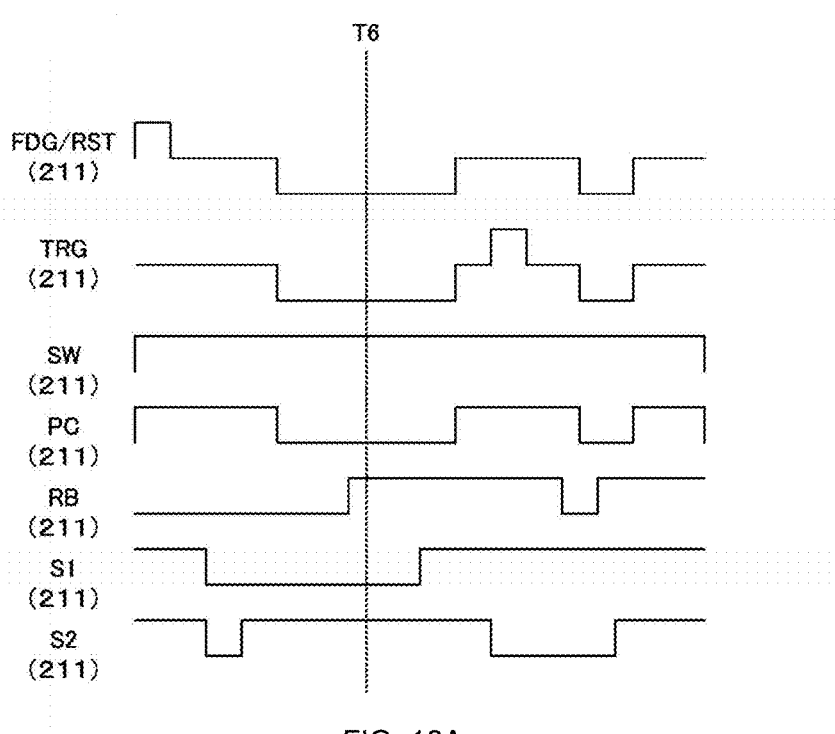
FIGS. 18A and 18B are views depicting an example of a circuit state at timing T6 in the first embodiment of the present technology.
Figure 18B:
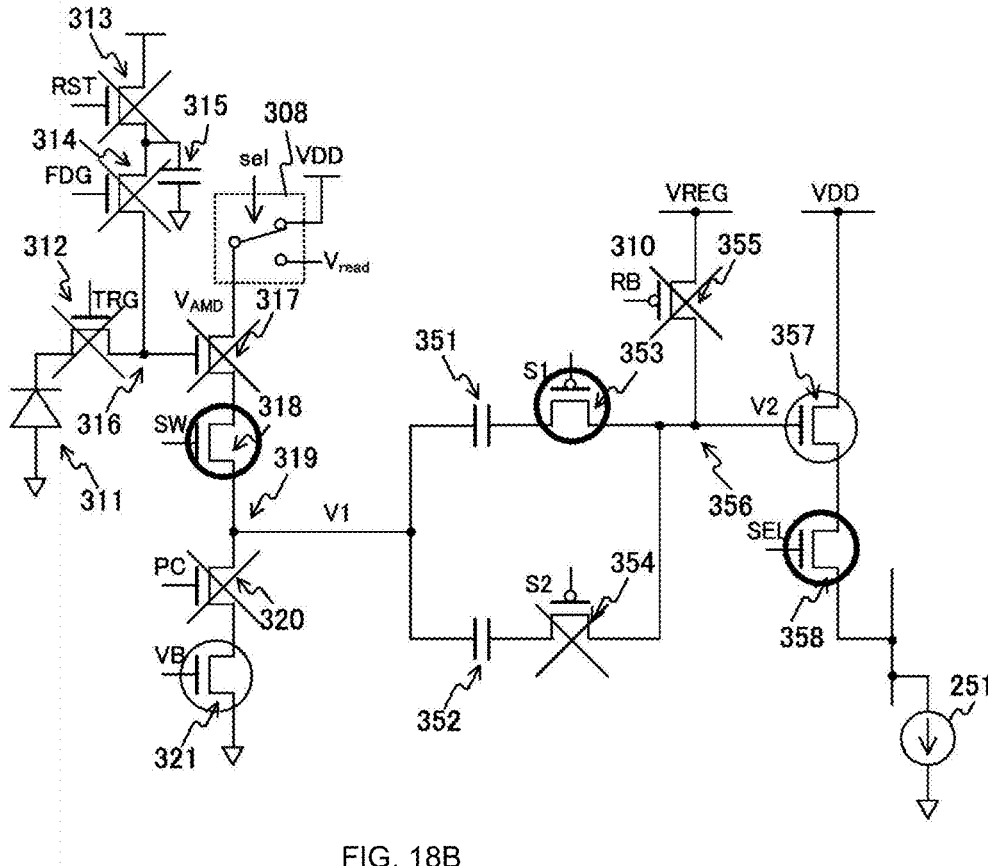

FIGS. 18A and 18B are views depicting an example of a circuit state at timing T6 in the first embodiment of the present technology. In FIGS. 18A and 18B, FIG. 18A depicts a position of timing T6 in the timing chart, and FIG. 18B depicts a circuit state of the pixel 300 at the timing.

As exemplified in FIG. 18B, the vertical scanning circuit 211 controls the post-stage reset transistor 355 to an off state.

Figures 19A, 19B:
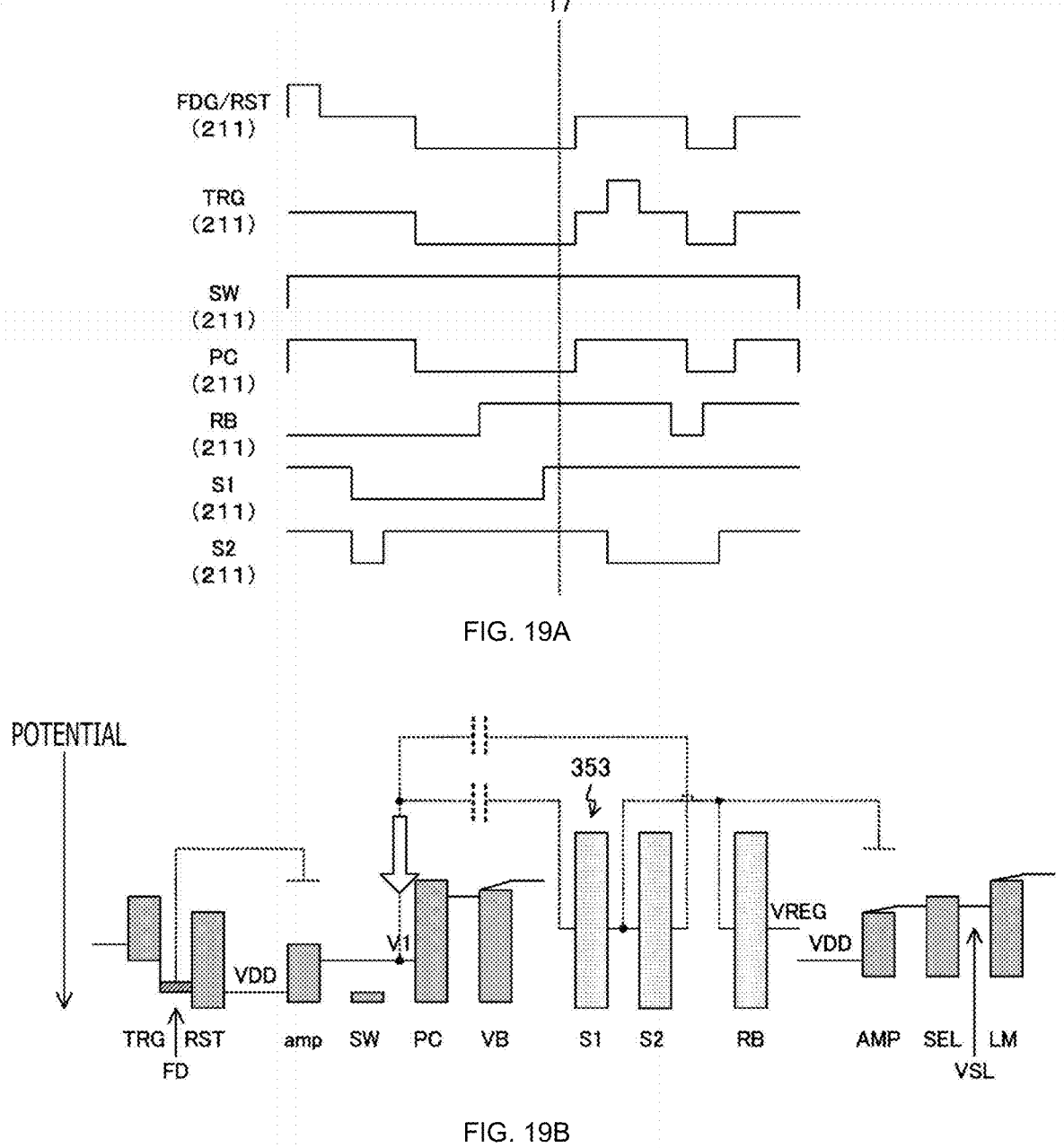
FIGS. 19A and 19B are examples of a potential diagrams at timing T7 in the first embodiment of the present technol-ogy.

FIGS. 19A and 19B are examples of a potential diagram at timing T7 in the first embodiment of the present technology. In FIGS. 19A and 19B, FIG. 19A depicts a position of timing T7 in the timing chart, and FIG. 19B depicts a potential diagram at the timing.

As exemplified in FIG. 19B, the gate voltage of the selection transistor 353 is controlled to the high level.

Figures 20A, 20B:
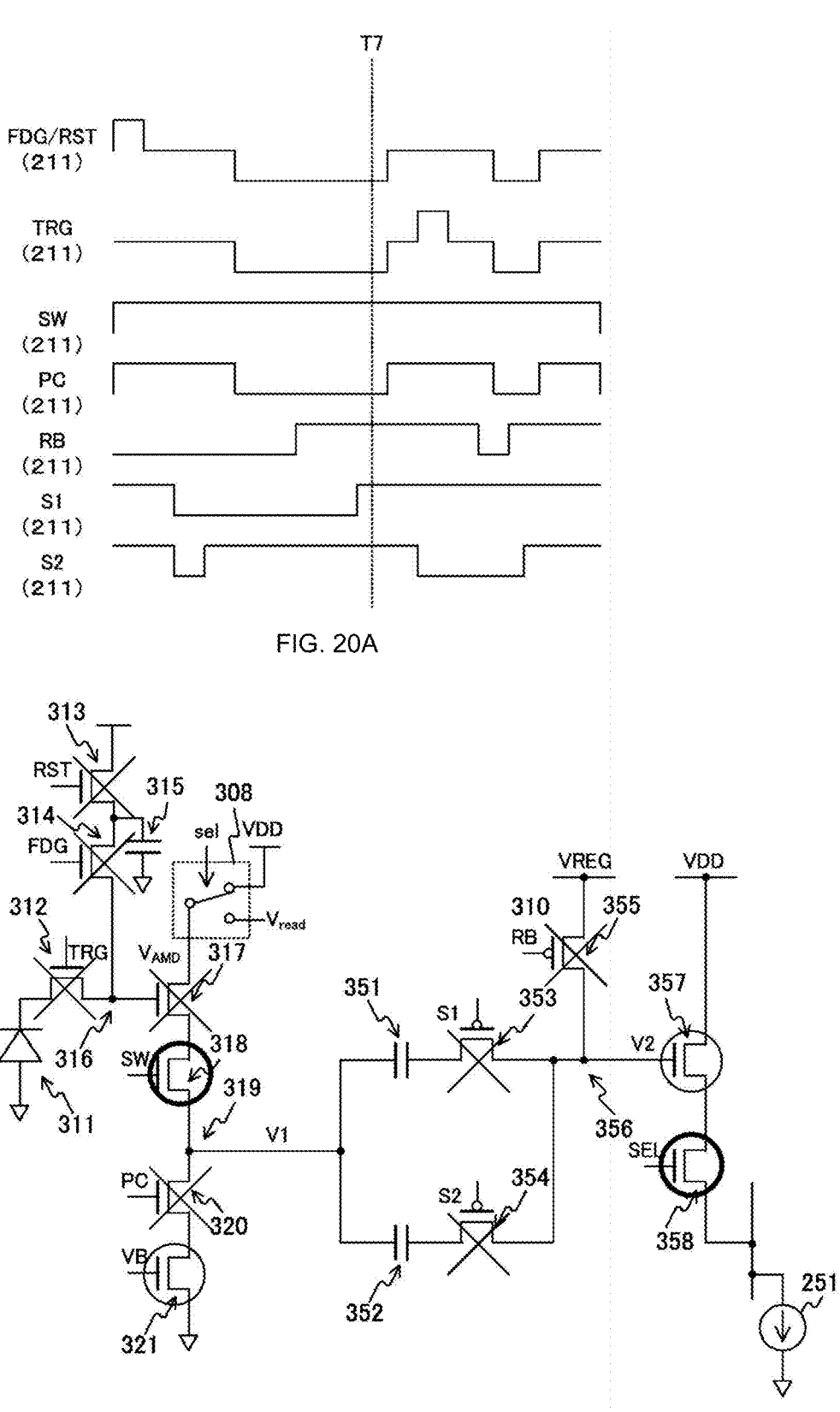
FIGS. 20A and 20B are views depicting an example of a circuit state at timing T7 in the first embodiment of the present technology.

FIGS. 20A and 20B are views depicting an example of a circuit state at timing T7 in the first embodiment of the present technology. In FIGS. 20A and 20B, FIG. 20A depicts a position of timing T7 in the timing chart, and FIG. 20B depicts a circuit state of the pixel 300 at the timing.

As exemplified in FIG. 20B, the vertical scanning circuit 211 controls the selection transistor 353 to an off state.

Here, assumed is a case in which, where the gate voltage of the pre-stage amplification transistor 317 and the potential V1 of the pre-stage node 319 are compared with each other when the gate voltage is to be returned from the low level to the middle level, the potential V1 is lower. In this case, there is a risk that charge sampled and held on purpose is extracted from the capacitive element 351.

In order to avoid this risk, the post-stage reset transistor 355 and the selection transistor 353 are individually configured as pMOS transistors as described hereinabove. When the pMOS transistor is to be turned off, the gate voltage thereof is changed from the low level to the high level. Thus, the potential V1 undergoes coupling in the positive direction. An outlined arrow mark in FIGS. 19A and 19B indicate the direction of potential fluctuation by the coupling. Since the potential V1 becomes higher than that at the time of holding, charge missing from the capacitive element 351 can be prevented.

Although a margin can be made more if all of the selection transistors 353 and 354 and the post-stage reset transistor 355 are configured as pMOS transistors, this configuration is not restrictive. For example, it is also possible to configure only the selection transistors 353 and 354 as pMOS transistors and configure the post-stage reset transistor 355 as an nMOS transistor. Alternatively, also it is possible to configure the selection transistors 353 and 354 as nMOS transistors and configure only the post-stage reset transistor 355 as a pMOS transistor.

Figures 21A, 21B:
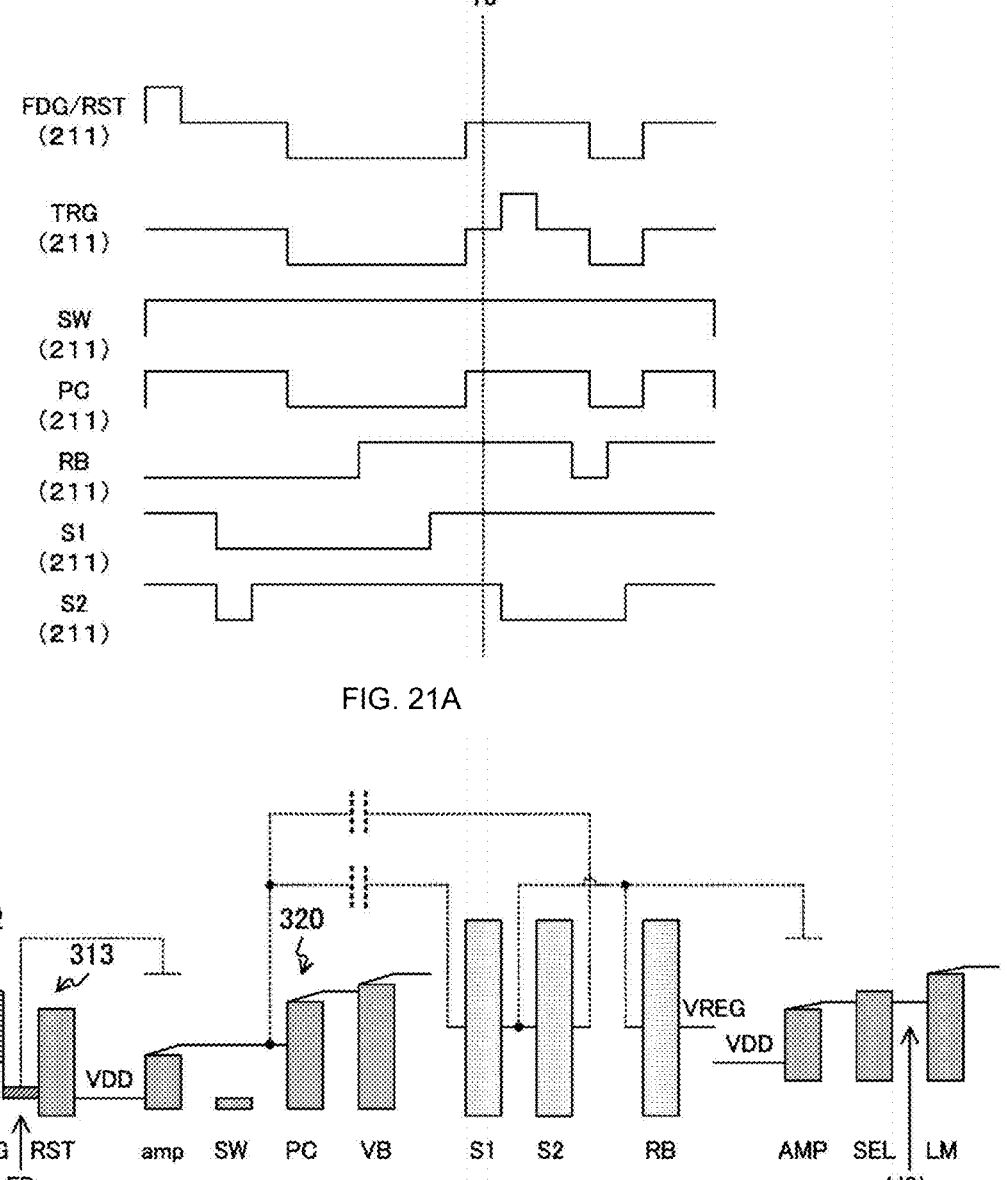
FIGS. 21A and 21B are examples of a potential diagrams at timing T8 in the first embodiment of the present technol-ogy.

FIGS. 21A and 21B are examples of a potential diagram at timing T8 in the first embodiment of the present technology. In FIGS. 21A and 21B, FIG. 21A depicts a position of timing T8 in the timing chart, and FIG. 21B depicts a potential diagram at the timing.

As exemplified in FIG. 21B, the gate voltage of the transfer transistor 312 and the reset transistor 313 is controlled to the middle level. Meanwhile, the gate voltage of the precharge transistor 320 is controlled to the high level. Since the potential V1 at this point of time is higher than that at the time of holding as described hereinabove, charge missing from the capacitive element 351 is prevented.

Figures 22A, 22B:
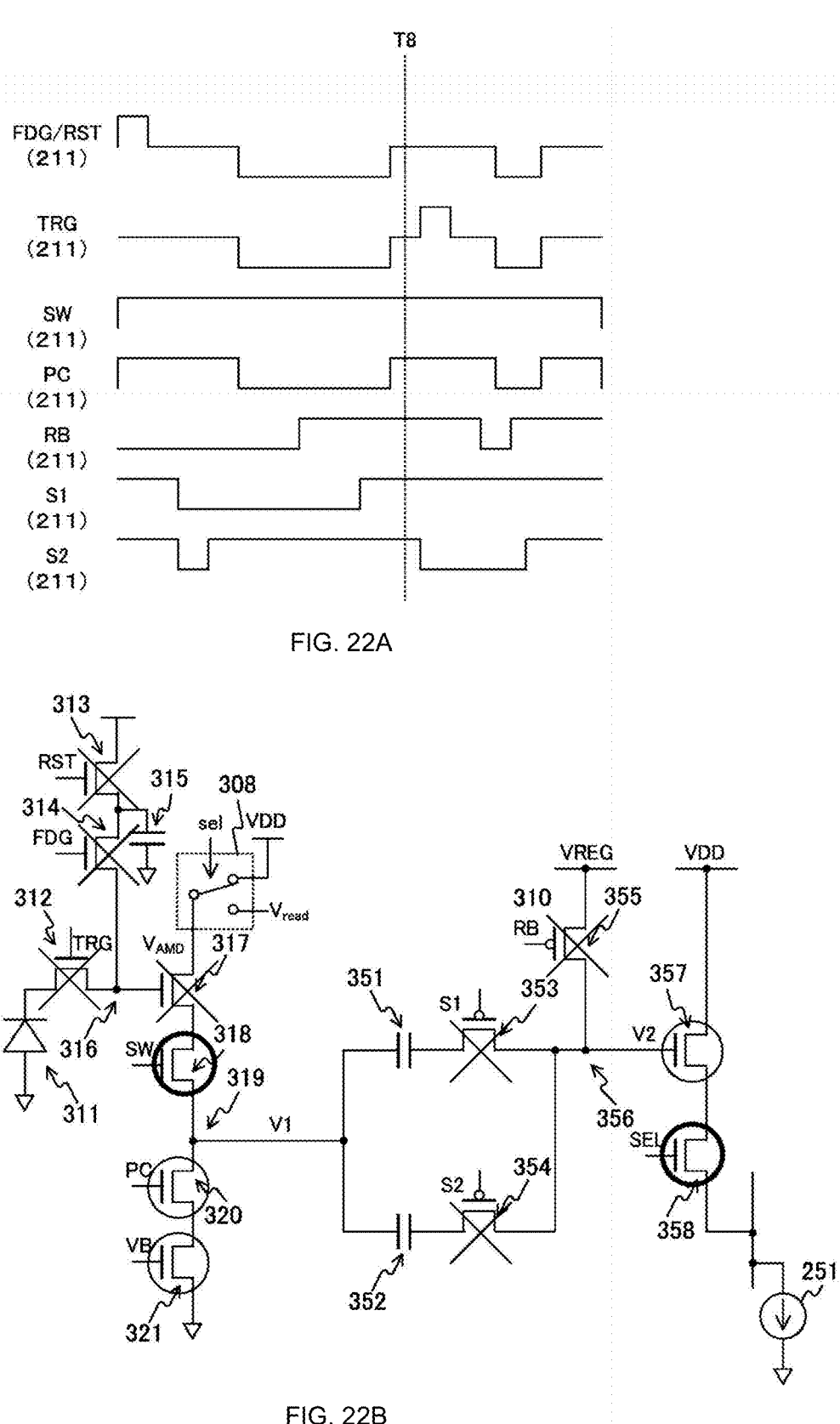
FIGS. 22A and 22B are views depicting an example of a circuit state at timing T8 in the first embodiment of the present technology.

FIGS. 22A and 22B are views depicting an example of a circuit state at timing T8 in the first embodiment of the present technology. In FIGS. 22A and 22B, FIG. 22A depicts a position of timing T8 in the timing chart, and FIG. 22B depicts a circuit state of the pixel 300 at the timing.

As exemplified in FIG. 22B, the vertical scanning circuit 211 controls the precharge transistor 320 to an on state.

Figure 23A:
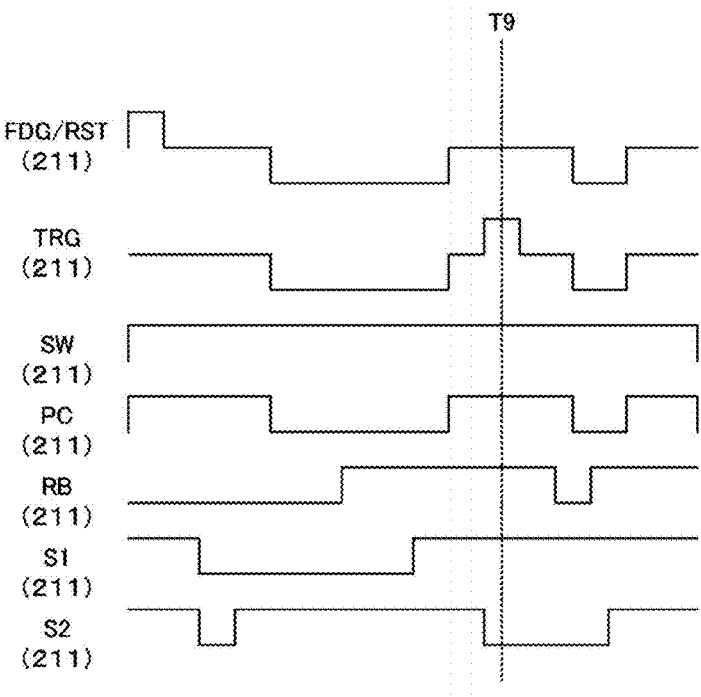
FIGS. 23A and 23B are examples of a potential diagrams at timing T9 in the first embodiment of the present technol-ogy.
Figure 23B:
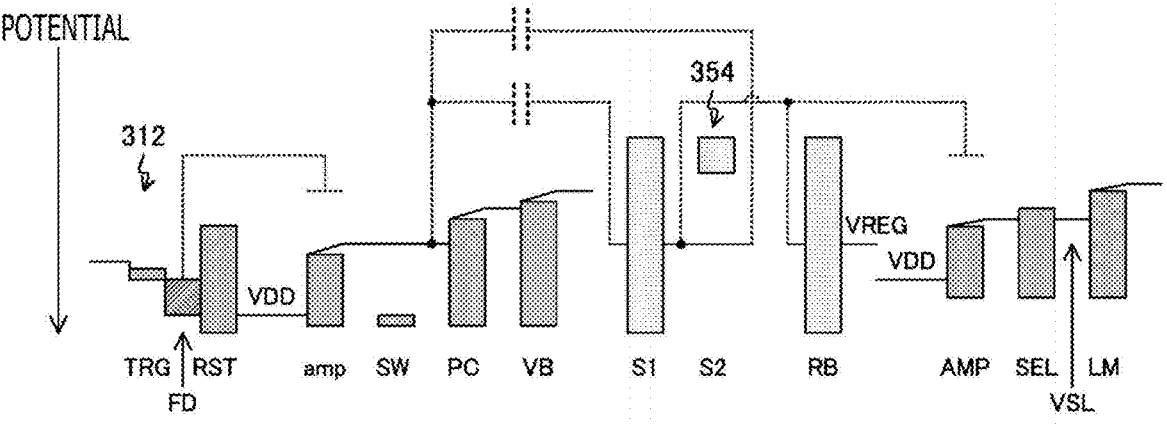

FIGS. 23A and 23B are examples of a potential diagram at timing T9 in the first embodiment of the present technology. In FIGS. 23A and 23B, FIG. 23A depicts a position of timing T9 in the timing chart, and FIG. 23B depicts a potential diagram at the timing.

As exemplified in FIG. 23B, the gate voltage of the transfer transistor 312 is controlled to the high level, and the gate voltage of the selection transistor 354 is controlled to the low level.

Figure 24A:
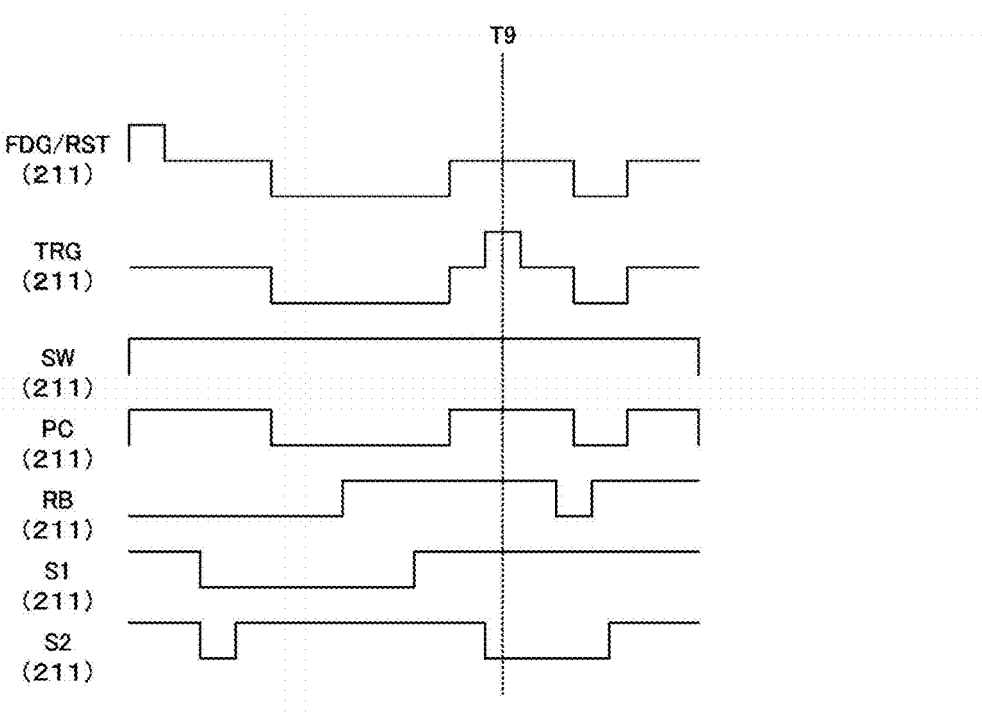
FIGS. 24A and 24B are views depicting an example of a circuit state at timing T9 in the first embodiment of the present technology.
Figure 24B:
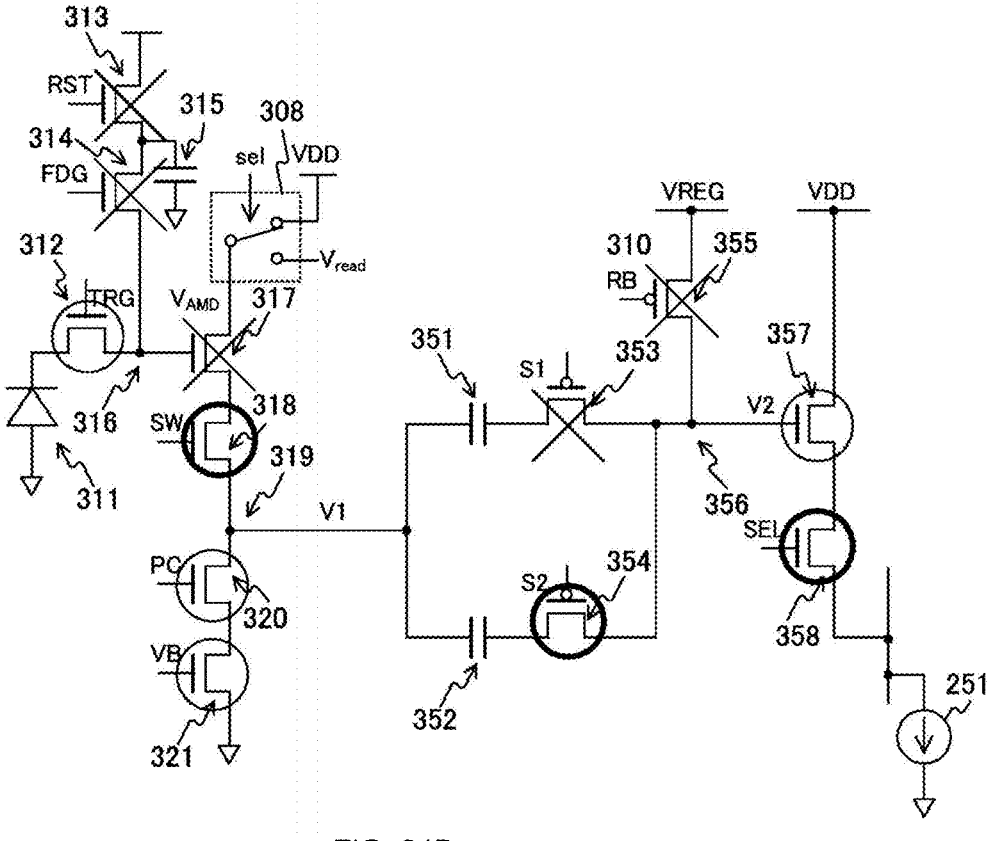

FIGS. 24A and 24B are views depicting an example of a circuit state at timing T9 in the first embodiment of the present technology. In FIGS. 24A and 24B, FIG. 24A depicts a position of timing T9 in the timing chart, and FIG. 24B depicts a circuit state of the pixel 300 at the timing.

As exemplified in FIG. 24B, the vertical scanning circuit 211 controls the transfer transistor 312 to an on state. Consequently, charge is transferred from the photoelectric conversion element 311 to the FD 316. Meanwhile, the selection transistor 354 is controlled to an on state.

Figures 25A, 25B:
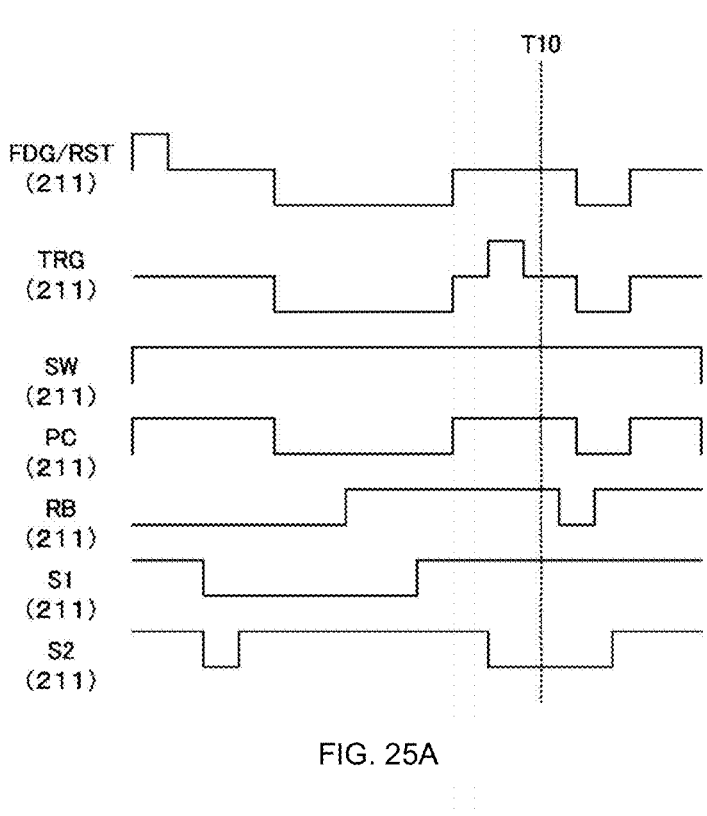
FIGS. 25A and 25B are examples of a potential diagrams at timing T10 in the first embodiment of the present tech-nology.

FIGS. 25A and 25B are examples of a potential diagram at timing T10 in the first embodiment of the present technology. In FIGS. 25A and 25B, FIG. 25A depicts a position of timing T10 in the timing chart, and FIG. 25B depicts a potential diagram at the timing.

As exemplified in FIG. 25B, the gate voltage of the transfer transistor 312 is controlled to the low level.

Figures 26A, 26B:
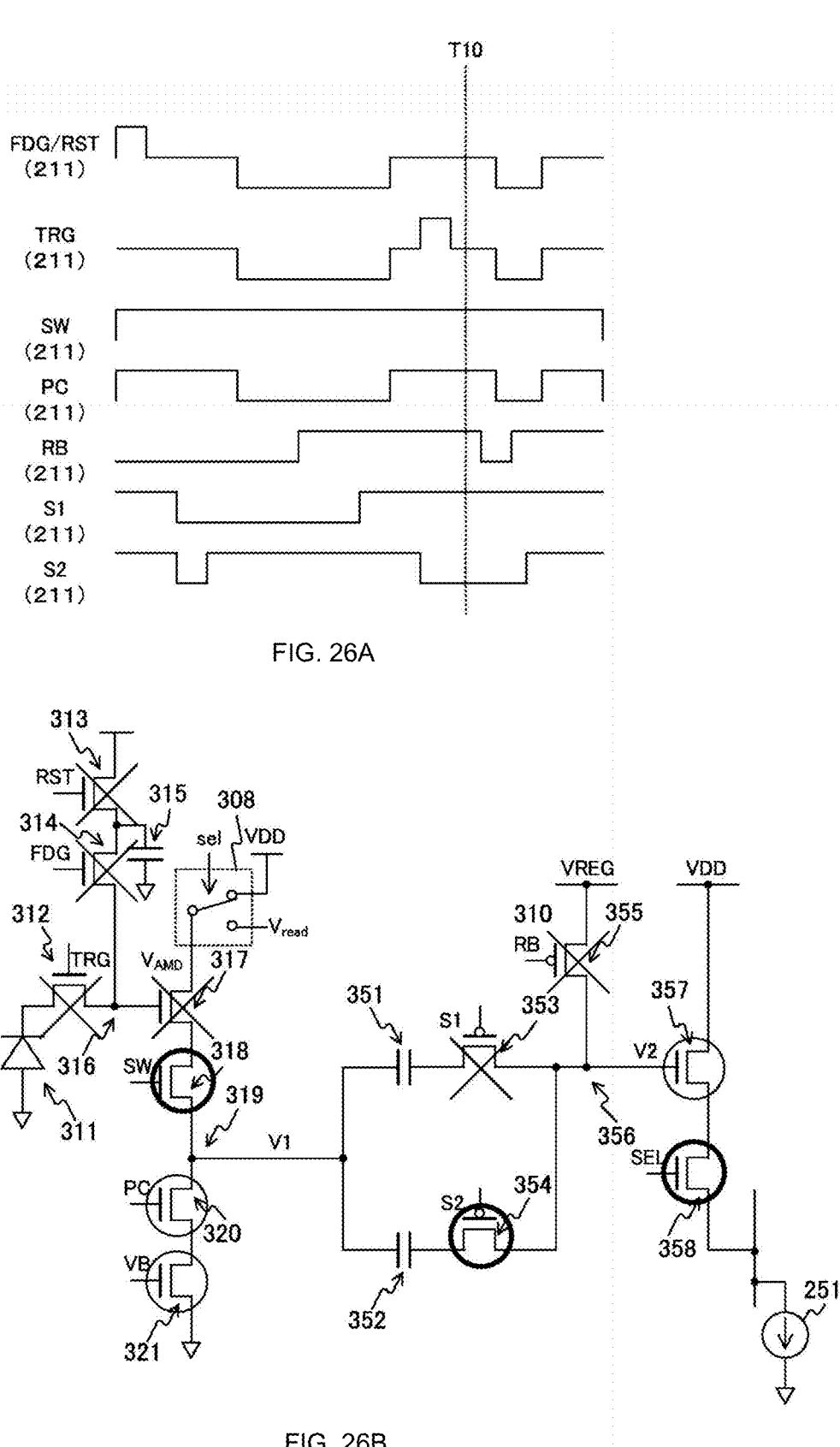
FIGS. 26A and 26B are views depicting an example of a circuit state at timing T10 in the first embodiment of the present technology.

FIGS. 26A and 26B are views depicting an example of a circuit state at timing T10 in the first embodiment of the present technology. In FIGS. 26A and 26B, FIG. 26A depicts a position of timing T10 in the timing chart, and FIG. 26B depicts a circuit state of the pixel 300 at the timing.

As exemplified in FIG. 26B, the vertical scanning circuit 211 controls the transfer transistor 312 to an off state. Consequently, the signal level is sampled.

Figures 27A, 27B:
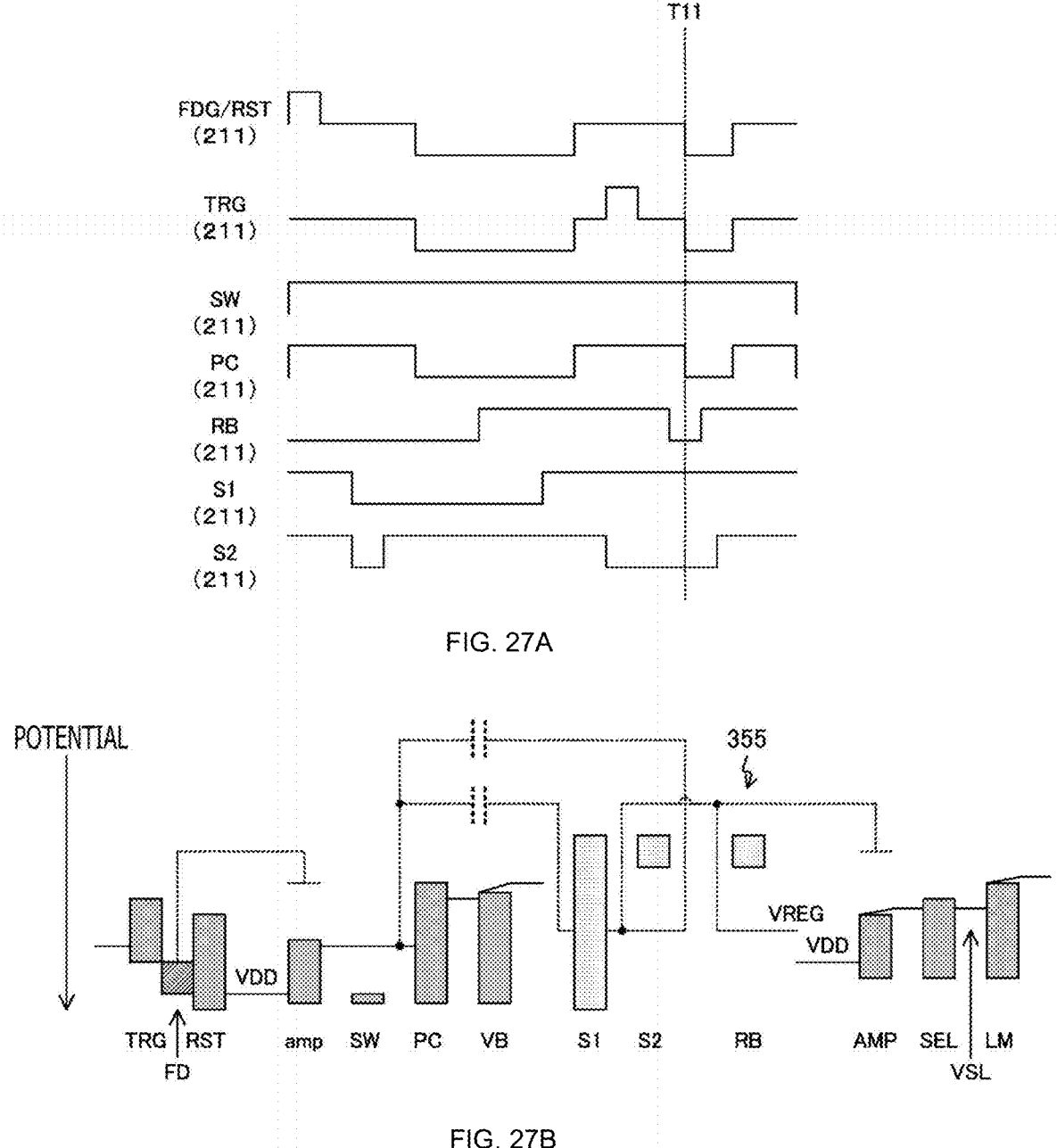
FIGS. 27A and 27B are examples of a potential diagrams at timing T11 in the first embodiment of the present tech-nology.

FIGS. 27A and 27B are examples of a potential diagram at timing T11 in the first embodiment of the present technology. In FIGS. 27A and 27B, FIG. 27A depicts a position of timing T11 in the timing chart, and FIG. 27B depicts a potential diagram at the timing.

As exemplified in FIG. 27B, the gate voltage of the post-stage reset transistor 355 is controlled to the low level.

Figures 28A, 28B:
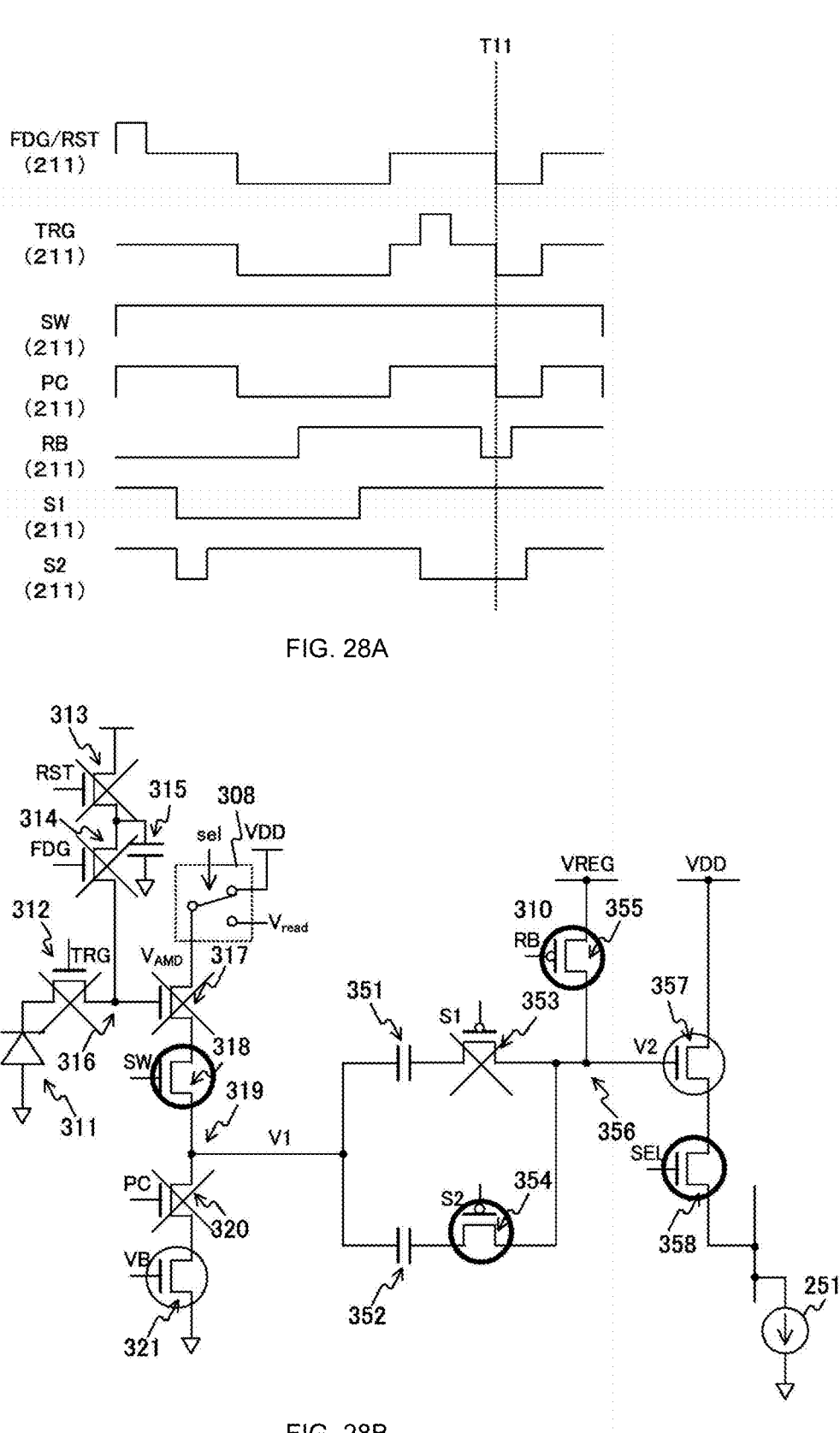
FIGS. 28A and 28B are views depicting an example of a circuit state at timing T11 in the first embodiment of the present technology.

FIGS. 28A and 28B are views depicting an example of a circuit state at timing T11 in the first embodiment of the present technology. In FIGS. 28A and 28B, FIG. 28B indicates a position of timing T11 in the timing chart, and FIG. 28B depicts a circuit state of the pixel 300 at the timing.

As exemplified in FIG. 28B, the vertical scanning circuit 211 controls the post-stage reset transistor 355 to an on state. Further, the vertical scanning circuit 211 controls the gate voltage of the transfer transistor 312 and the reset transistor 313 to the low level to perform soft reset on the pre-stage amplification transistor 317 again. Further, the vertical scanning circuit 211 simultaneously controls the gate voltage of the precharge transistor 320 to the low level.

Figures 29A, 29B:
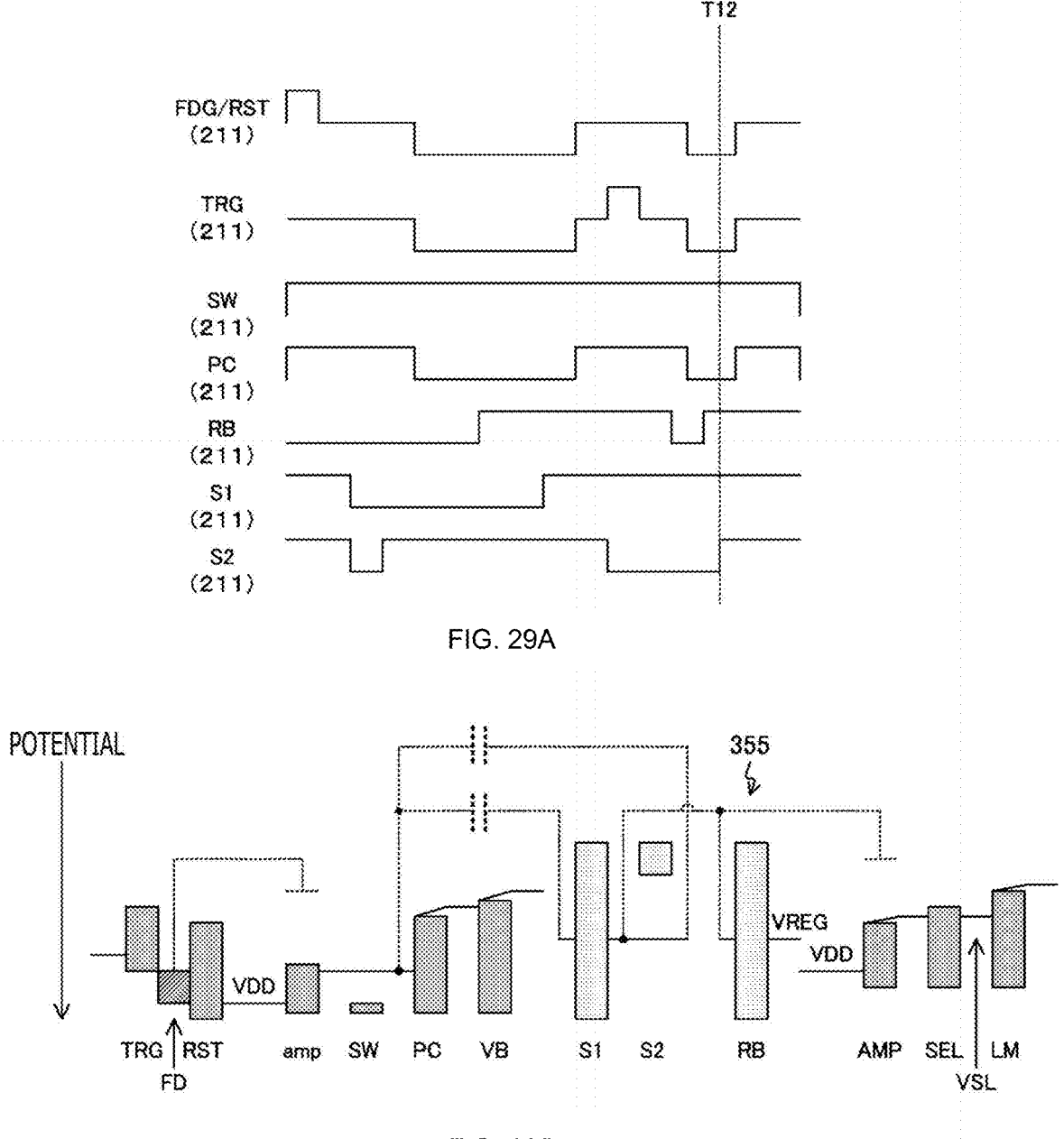
FIGS. 29A and 29B are examples of a potential diagrams at timing T12 in the first embodiment of the present tech-nology.

FIGS. 29A and 29B are examples of a potential diagram at timing T12 in the first embodiment of the present technology. In FIGS. 29A and 29B, FIG. 29A depicts a position of timing T12 in the timing chart, and FIG. 29B depicts a potential diagram at the timing.

As exemplified in FIG. 29B, the vertical scanning circuit 211 controls the gate voltage of the post-stage reset transistor 355 to the high level.

Figure 30A:
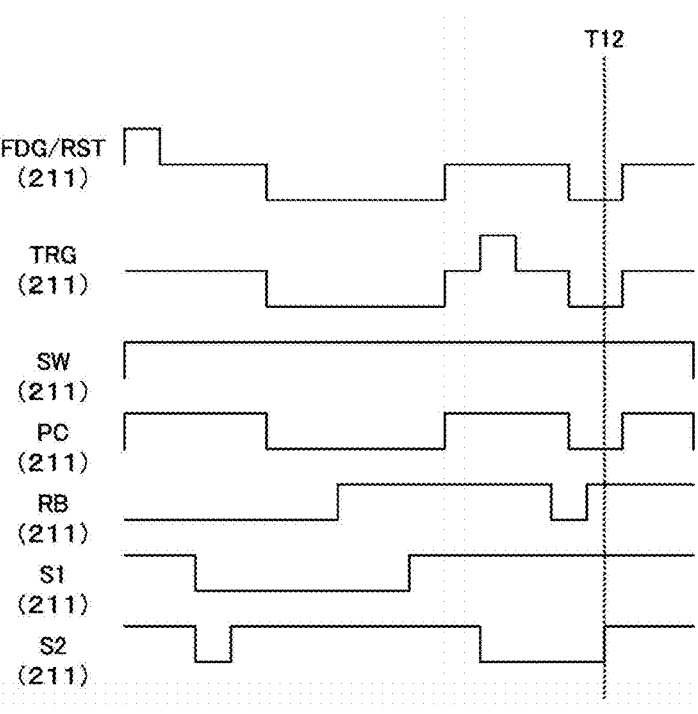
FIGS. 30A and 30B are views depicting an example of a circuit state at timing T12 in the first embodiment of the present technology.
Figure 30B:
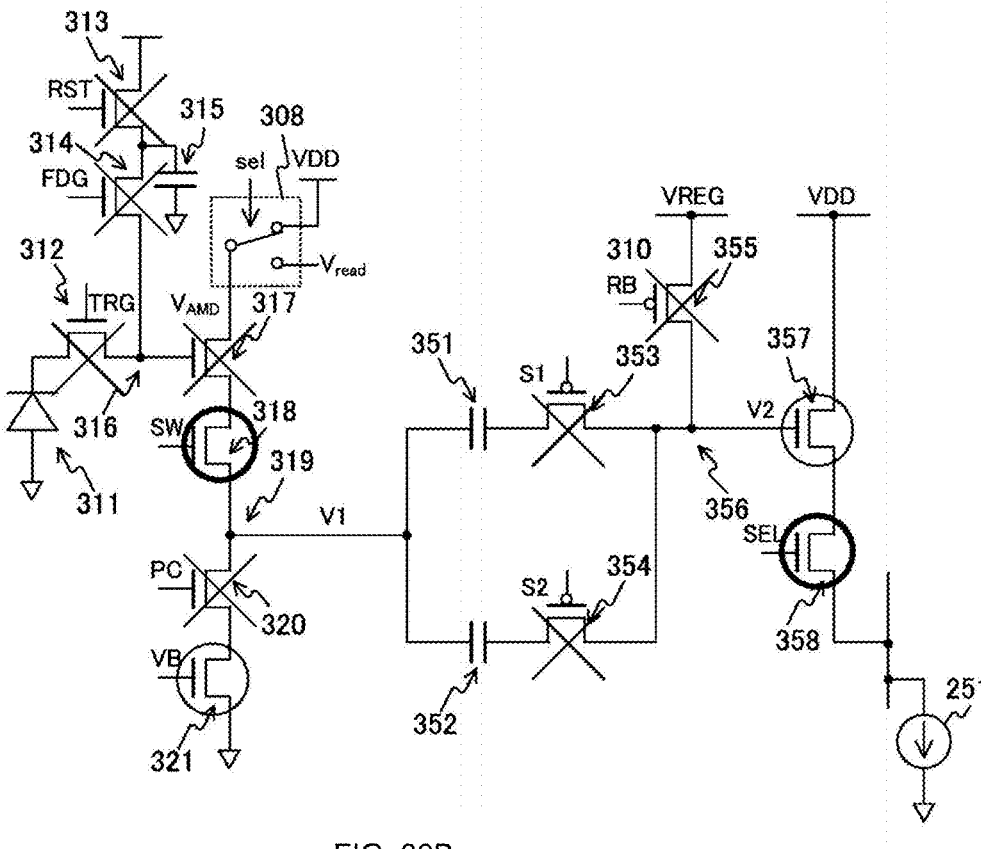

FIGS. 30A and 30B are views depicting an example of a circuit state at timing T12 in the first embodiment of the present technology. In FIGS. 30A and 30B, FIG. 30A depicts a position of timing T12 in the timing chart, and FIG. 30B depicts a circuit state of the pixel 300 at the timing.

As exemplified in FIG. 30B, the vertical scanning circuit 211 controls the post-stage reset transistor 355 to an off state and controls the selection transistor 354 to an off state.

Figures 31A, 31B:
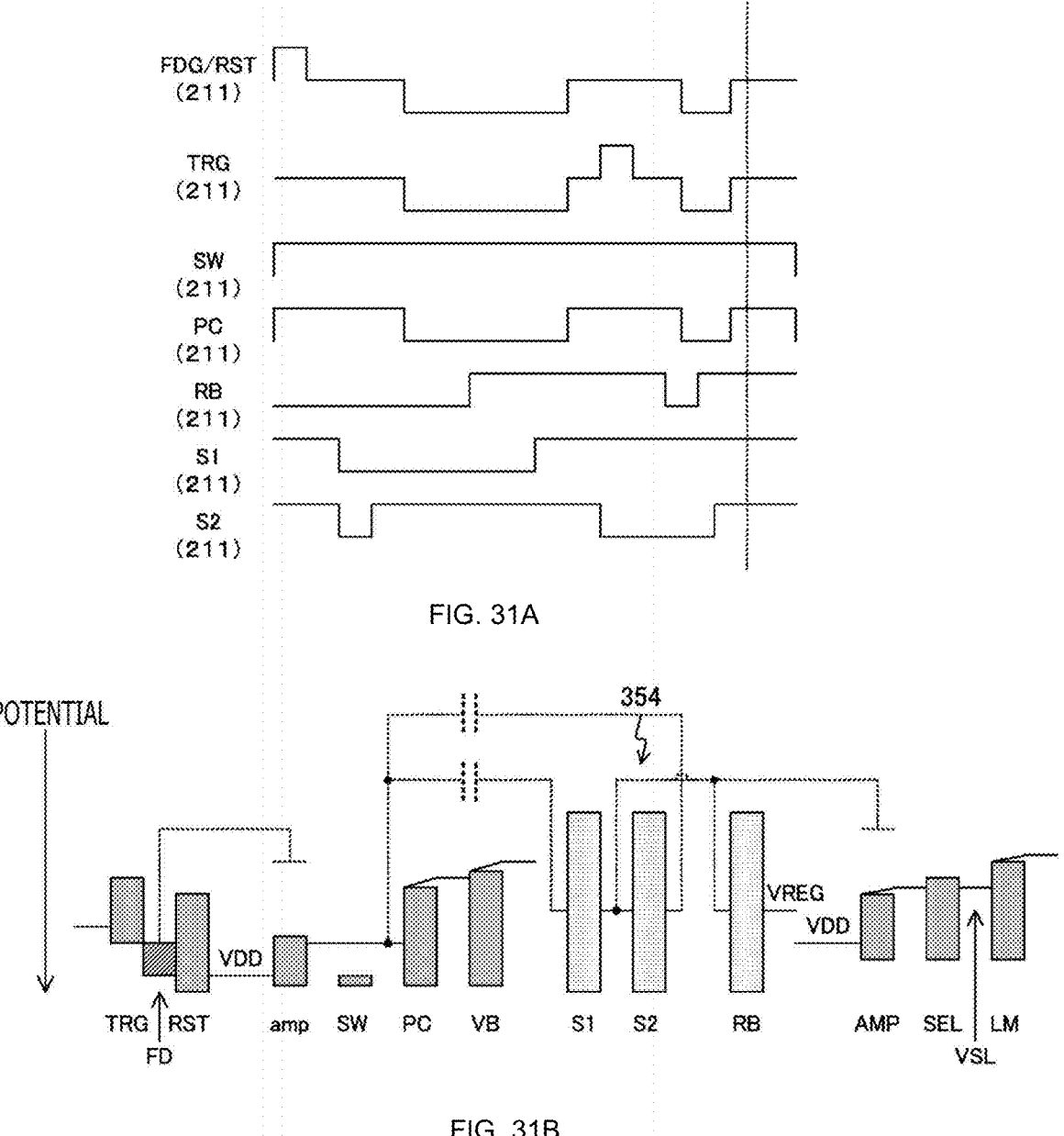
FIGS. 31A and 31B are examples of a potential diagrams at timing T13 in the first embodiment of the present tech-nology.

FIGS. 31A and 31B are examples of a potential diagram at timing T13 in the first embodiment of the present technology. In FIGS. 31A and 31B, FIG. 31A depicts a position of timing T13 in the timing chart, and FIG. 31B depicts a potential diagram at the timing.

As exemplified in FIG. 31B, the gate voltage of the selection transistor 354 is controlled to the high level.

Figures 32A, 32B:
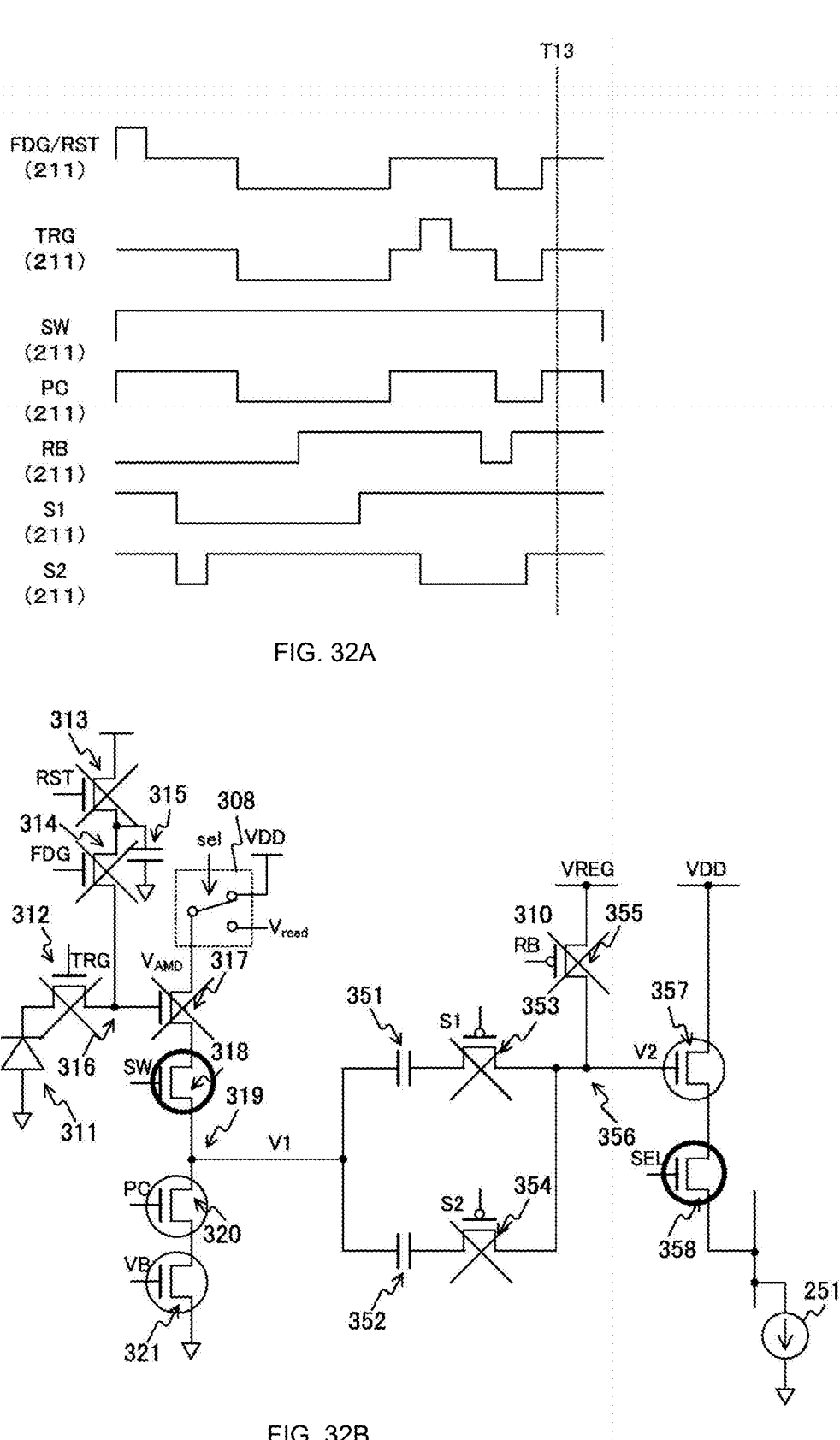
FIGS. 32A and 32B are views depicting an example of a circuit state at timing T13 in the first embodiment of the present technology.

FIGS. 32A and 32B are views depicting an example of a circuit state at timing T13 in the first embodiment of the present technology. In FIGS. 32A and 32B, FIG. 32A depicts a position of timing T13 in the timing chart, and FIG. 32B depicts a circuit state of the pixel 300 at the timing.

As exemplified in FIG. 32B, the vertical scanning circuit 211 controls the gate voltage of the transfer transistor 312 and the reset transistor 313 back to the middle level and controls the gate voltage of the precharge transistor 320 to the high level to restore its stationary state.

Here, a solid-state image sensor that does not perform soft reset on the pre-stage amplification transistor 317 but performs hard reset on the post-stage reset transistor 355 when a signal level is to be held is assumed as a comparative example.

Figure 33:
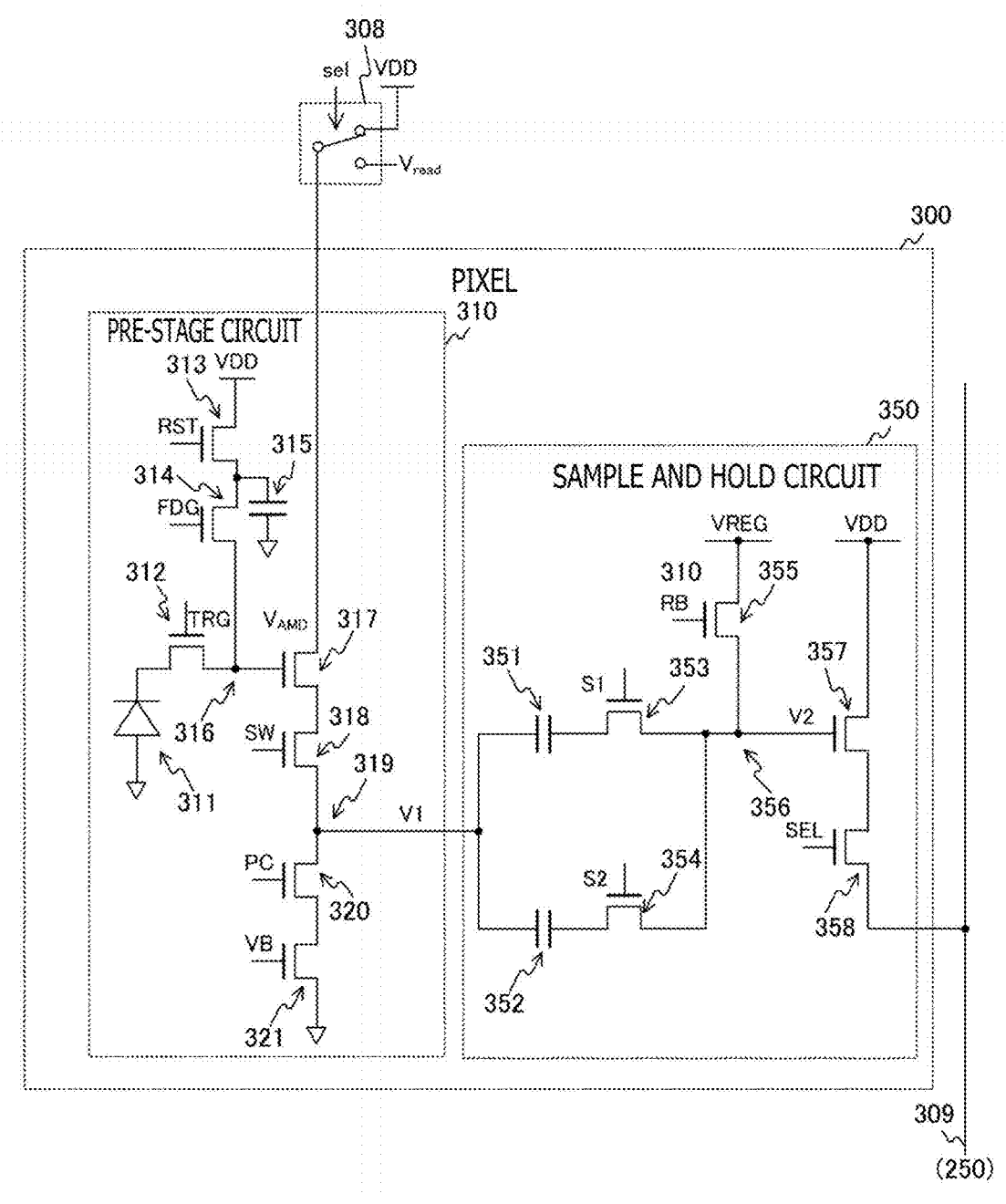
FIG. 33 is a circuit diagram depicting an example of a configuration of a pixel in a comparative example.

FIG. 33 is a circuit diagram depicting an example of a configuration of the pixel 300 in the comparative example. In the present comparative example, the selection transistors 353 and 354 and the post-stage reset transistor 355 are nMOS transistors.

Figure 34:
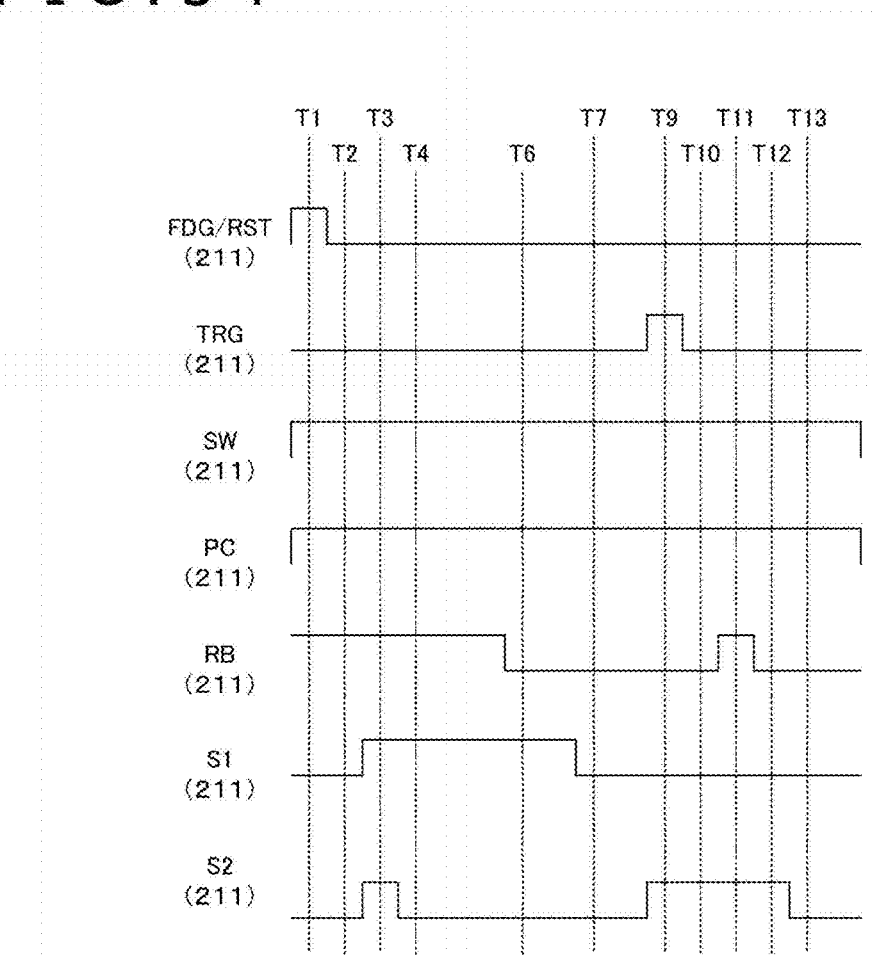
FIG. 34 is a timing chart illustrating an example of action of a solid-state image sensor in the comparative example.

FIG. 34 is a timing chart illustrating an example of action of the solid-state image sensor in the comparative example. In the comparative example, the transfer signal TRG, the reset signal RST, and the control signal FDG are controlled to one of a high level and a low level. In particular, the transfer transistor 312, the reset transistor 313, and the conversion efficiency controlling transistor 314 corresponding to the signals are driven by two values.

Further, since the selection transistors 353 and 354 and the post-stage reset transistor 355 are nMOS transistors, the polarities of the post-stage reset signal RB and the selection signals S1 and S2 corresponding to them are reversed.

Figures 35A, 35B:
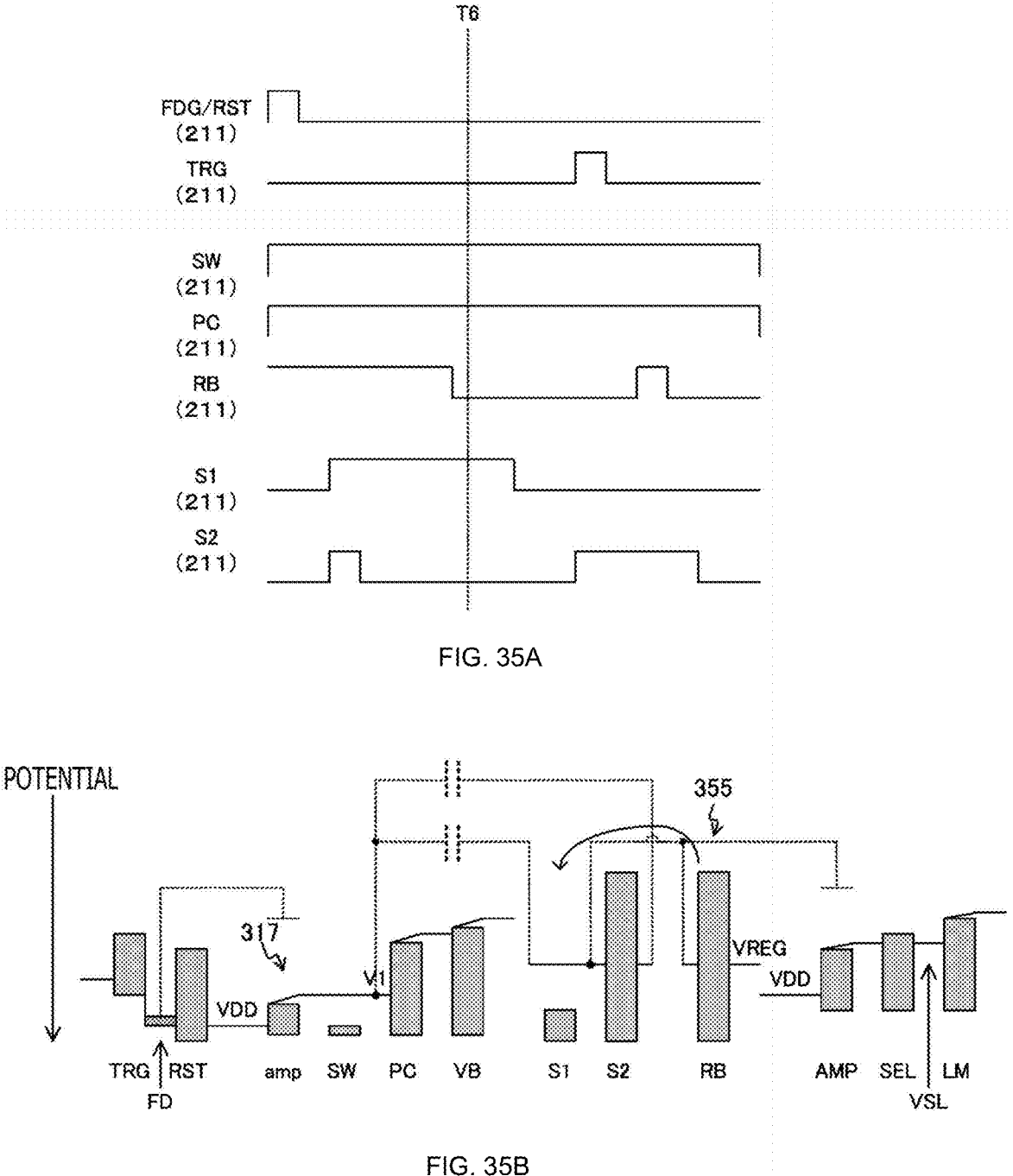
FIGS. 35A and 35B are examples of a potential diagram upon sampling of a reset level in in the comparative example.

FIGS. 35A and 35B are examples of a potential diagrams at the time of sampling of the reset level in the comparative example. In FIGS. 35A and 35B, FIG. 35A indicates a position of timing T6 in the timing chart, and FIG. 35B depicts a potential diagram at the timing.

As exemplified in FIG. 35B, the gate voltage of the post-stage reset transistor 355 is controlled to the low level. Meanwhile, the gate voltage of the pre-stage amplification transistor 317 remains at the high level.

Figures 36A, 36B:
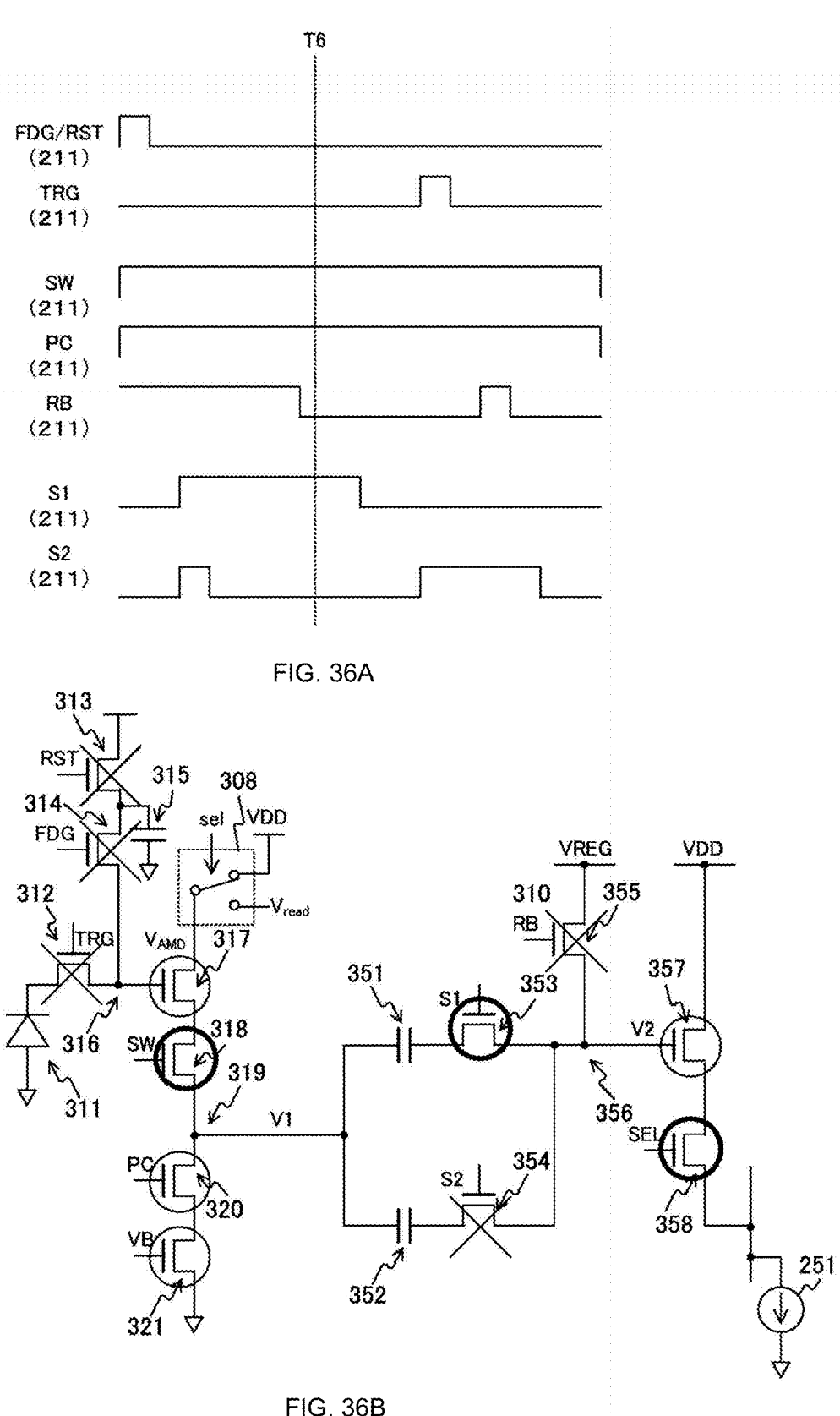
FIGS. 36A and 36B are views depicting an example of a circuit state upon sampling of the reset level in the com-parative example.

FIGS. 36A and 36B are views depicting an example of a circuit state at the time of sampling of the reset level in the comparative example. In FIGS. 36A and 36B, FIG. 36A depicts a position of timing T6 in the timing chart, and FIG. 36B depicts a circuit state of the pixel 300 at the timing.

As exemplified in FIG. 36B, the vertical scanning circuit 211 performs hard reset on the post-stage reset transistor 355. At this time, the pre-stage amplification transistor 317 remains in the on state.

In the configuration in which, when a reset level is to be held, the post-stage reset transistor 355 on the right side of the capacitive element 351 is subjected to hard reset as in the comparative example, kTC noise is generated. Since the drain voltage of the post-stage reset transistor 355 is VREG that is lower than the power supply voltage VDD, it is difficult to perform soft reset on the post-stage reset transistor 355.

In contrast, in the first embodiment, when a reset level is to be held, the vertical scanning circuit 211 controls the gate voltage of the transfer transistor 312 and the reset transistor 313 from the middle level to the low level as exemplified in FIGS. 15A and 15B. Consequently, while the post-stage reset transistor 355 on the right side of the capacitive element 351 remains in the on state, the pre-stage amplification transistor 317 on the left side can be subjected to soft reset as exemplified in FIGS. 16A and 16B. As a result, kTC noise can be reduced than that of the comparative example in which the pre-stage amplification transistor 317 is subjected to hard reset. By the reduction of noise, the picture quality of image data can be improved.

Further, the vertical scanning circuit 211 controls the transfer signal TRG, the reset signal RST, and the control signal FDG from the low level back to the middle level immediately before transfer of charge. Consequently, it is possible to recover charge lost when the signals are controlled from the middle level to the low level, and missing of information concerning the reset level can be prevented.

Further, since the post-stage reset transistor 355 and the selection transistor 353 are configured as pMOS transistors, the coupling to which the potential V1 of the pre-stage node 319 is to be subjected when the transistors are turned off occurs in the positive direction. Thus, when the gate voltage of the pre-stage amplification transistor 317 is controlled from the low level back to the middle level, missing of charge from the capacitive element 351 can be prevented.

It is to be noted that it is also possible to omit the conversion efficiency controlling transistor 314, the capacitive element 315, the selector 308, and the switching transistor 318 as exemplified in FIG. 37. Also it is possible to omit only some of them. For example, it is possible to omit only the capacitive element 315. Alternatively, it is also possible to omit the conversion efficiency controlling transistor 314 and the capacitive element 315.

In such a manner, with the first embodiment of the present technology, since the vertical scanning circuit 211 performs soft reset on the pre-stage amplification transistor 317 at the time of controlling the reset level to be held, kTC noise can be reduced in comparison with that in an alternative case in which hard reset is performed. Consequently, the picture quality of image data can be improved.

2. Second Embodiment

Although, in the first embodiment described above, the circuits in the solid-state image sensor 200 are arranged in a single semiconductor chip, with the present configuration, there is the possibility that refinement of pixels may become difficult. The solid-state image sensor 200 in the present second embodiment is different from that in the first embodiment in that the solid-state image sensor 200 has a laminated structure.

Figure 38:
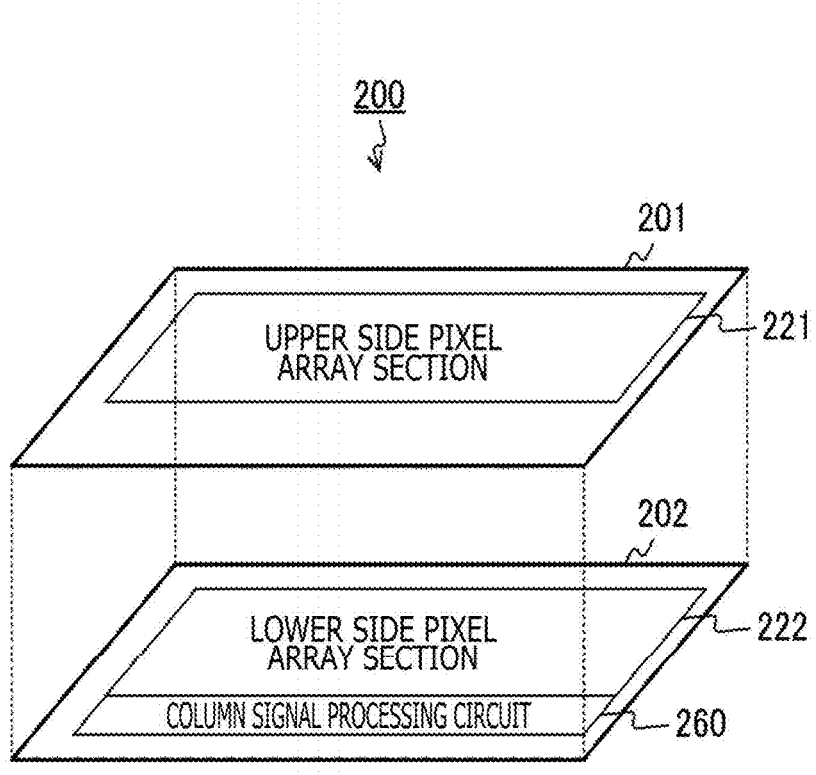
FIG. 38 is a view depicting an example of a stacked structure of a solid-state image sensor in a second embodi-ment of the present technology.

Described with reference to FIG. 38, the solid-state image sensor 200 of the second embodiment includes a lower chip 202 and an upper chip 201 laminated on the lower chip 202. The chips are electrically connected to each other, for example, by Cu—Cu coupling. It is to be noted that, in addition to the Cu—Cu coupling, also a via or a bump can be used for the connection.

On the upper chip 201, an upper side pixel array section 221 is arranged. On the lower chip 202, a lower side pixel array section 222 and the column signal processing circuit 260 are arranged. For each of the pixels in the pixel array section 220, part of it is arranged on the upper side pixel array section 221 while the remaining part of it is arranged on the lower side pixel array section 222. It is to be noted that the upper chip 201 and the lower chip 202 are an example of first and second semiconductor chips described in the claims, respectively.

Further, on the lower chip 202, also the vertical scanning circuit 211, the timing controlling circuit 212, the DAC 213, and the load MOS circuit block 250 are arranged. The circuits mentioned are omitted in FIG. 38.

Figure 39:
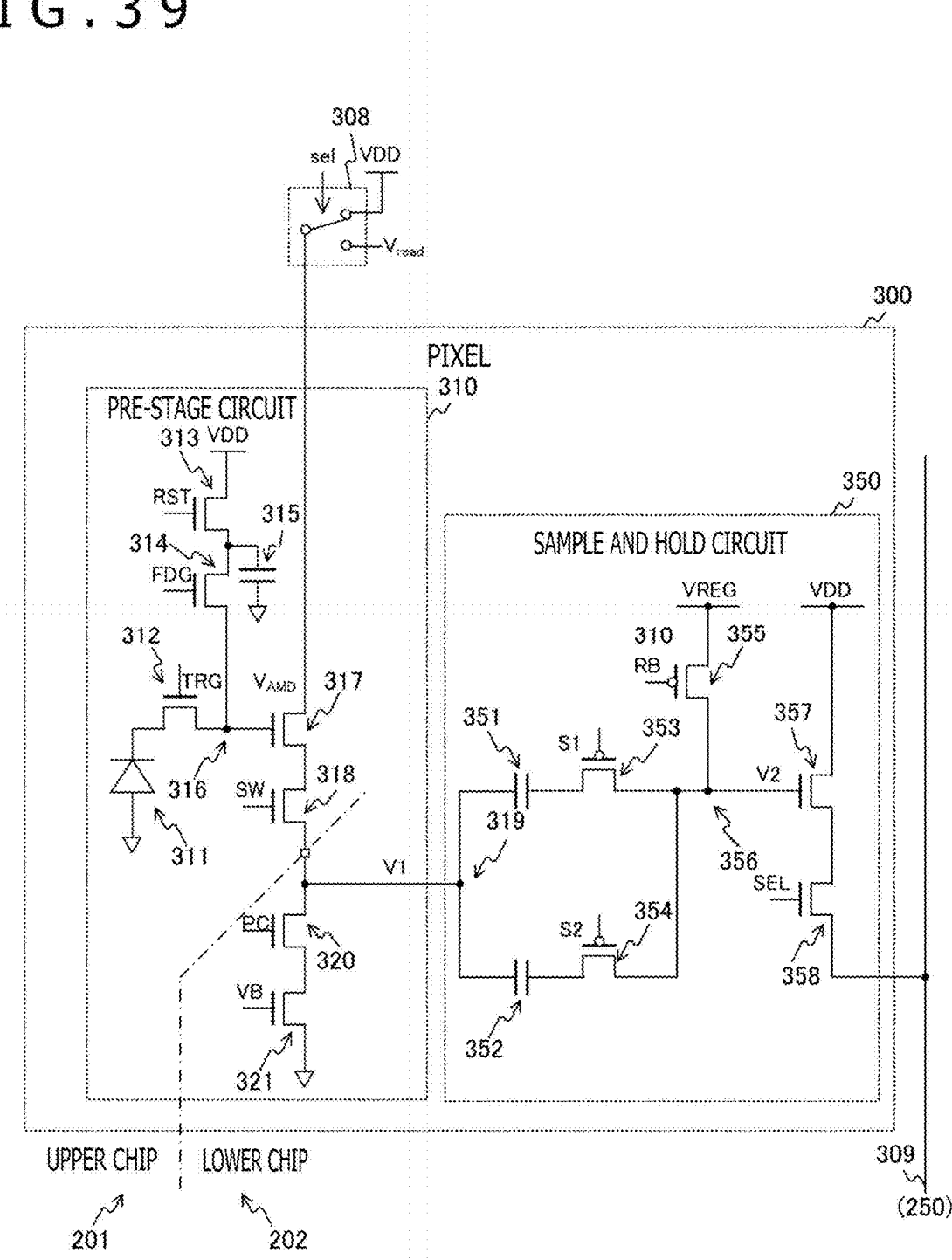
FIG. 39 is a circuit diagram depicting an example of a configuration of a pixel in the second embodiment of the present technology.

FIG. 39 is a circuit diagram depicting an example of a configuration of the pixel 300 in the second embodiment of the present technology. Elements in the pre-stage circuit 310 other than the precharge transistor 320 and the current source transistor 321 are arranged on the upper chip 201. The precharge transistor 320, the current source transistor 321, the sample and hold circuit 350, and the succeeding circuits are arranged on the lower chip 202. By the elements in the pixel 300 being arranged in a distributed manner on the upper chip 201 and the lower chip 202 laminated on each other as exemplified in FIG. 39, the area of the pixels can be reduced, and refinement of the pixels is facilitated.

In such a manner, with the second embodiment of the present technology, since the circuits and the elements in the pixel 300 are arranged in a distributed manner on two semiconductor chips, refinement of the pixels is facilitated.

<Example of Application to Mobile Body>

The technology according to the present disclosure (present technology) can be applied to various products. For example, the technology according to the present disclosure may be implemented as an apparatus to be incorporated in any of various kinds of mobile bodies such as automobiles, electric automobiles, hybrid electric automobiles, motorcycles, bicycles, personal mobilities, airplanes, drones, ships, and robots.

FIG. 40 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 40, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 40, an audio speaker 12061, a display section 12062, and an instrument panel 12063 are illustrated as the output device. The display section 12062 may, for example, include at least one of an on-board display and a head-up display.

Figure 41:
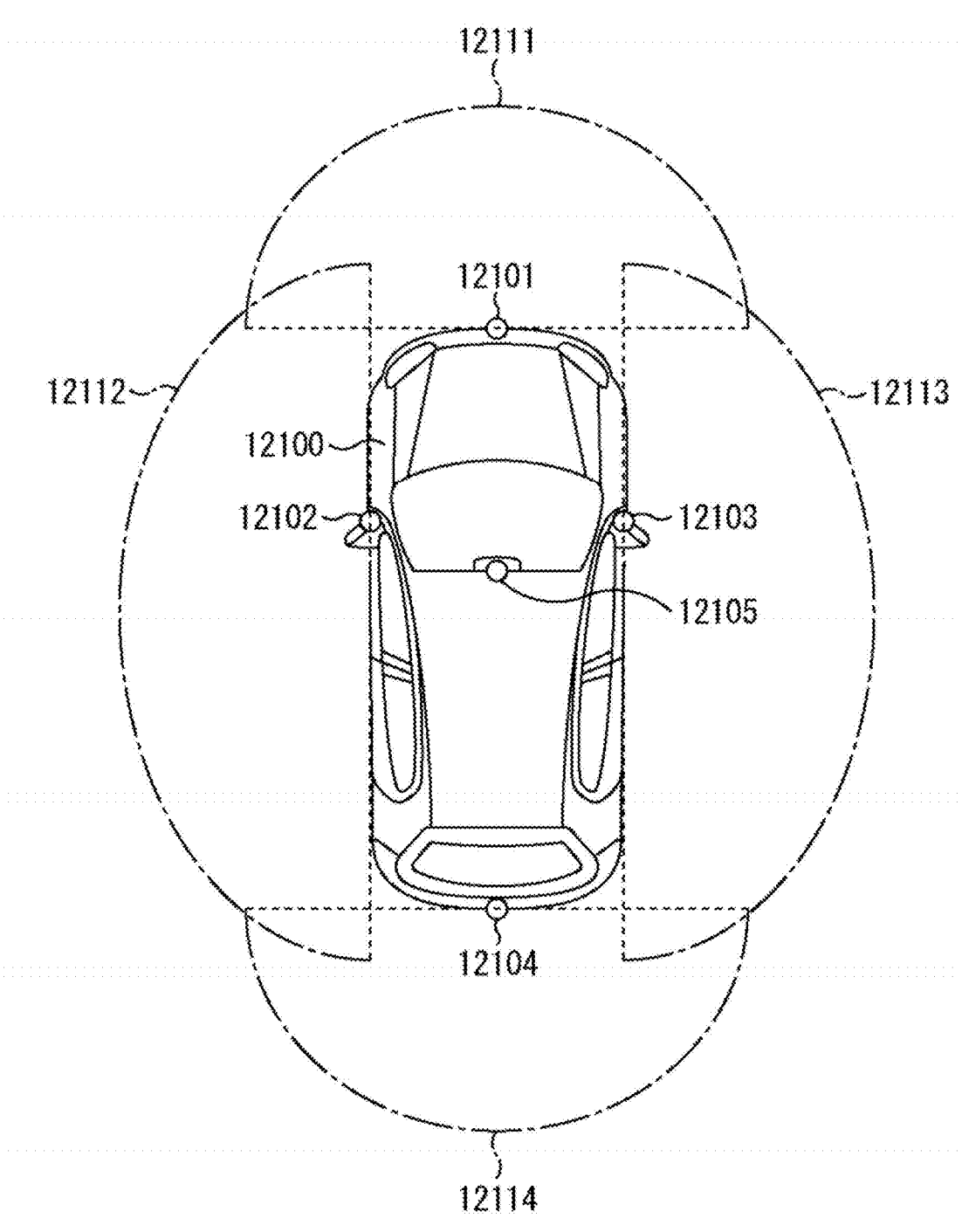
FIG. 41 is a diagram of assistance in explaining an example of installation positions of an outside-vehicle information detecting section and an imaging section.

FIG. 41 is a diagram depicting an example of the installation position of the imaging section 12031.

In FIG. 41, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 41 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of a vehicle control system to which the technology according to the present disclosure can be applied has been described. The technology according to the present disclosure can be applied, for example, to the imaging section 12031 in the configuration described hereinabove. In particular, the imaging apparatus 100 of FIG. 1 can be applied to the imaging section 12031. Applying the present disclosure to the imaging section 12031 makes it possible to reduce noise and obtain a captured image that is easier to see, and thus, the fatigue of the driver can be reduced.

It is to be noted that the embodiments described above indicate examples for embodying the present technology, and matters in the embodiments and matters specifying the invention in the claims have individual corresponding relations with each other. Similarly, matters specifying the invention in the claims and matters in the embodiments denoted by identical names individually have correspondence relations with each other. However, the present technology is not restricted to the embodiments and can be embodied by applying various modifications to the embodiments without departing from the subject matter of the present invention.

It is to be noted that the advantageous effects described in the present specification are exemplary to the last and are not restrictive, and also other advantageous effects may be available.

It is further to be noted that the present technology can also take the following configurations.

(1)

A solid-state image sensor including:

a transfer transistor that transfers charge from a photoelectric conversion element to a floating diffusion layer;

a reset transistor that initializes the floating diffusion layer;

a pre-stage amplification transistor that amplifies and outputs a voltage of the floating diffusion layer;

a plurality of capacitive elements that hold the outputted voltage; and a vertical scanning circuit that performs soft reset on the pre-stage amplification transistor when a reset level that is the voltage when the floating diffusion layer is initialized is to be held in any one of the plurality of capacitive elements.

(2)

The solid-state image sensor according to (1) above, in which a transfer signal is inputted to a gate of the transfer transistor, a reset signal is inputted to a gate of the reset transistor, the transfer signal and the reset signal are controlled to any one of a high level, a middle level lower than the high level, and a low level lower than the middle level, and the vertical scanning circuit controls, when the reset level is to be held, the transfer signal and the reset signal from the middle level to the low level and controls the transfer signal and the reset signal from the low level to the middle level immediately before the charge is transferred.

(3)

The solid-state image sensor according to (1) or (2) above, further including:

a plurality of selection transistors that connect one end of any one of the plurality of capacitive elements to a post-stage node; and a post-stage reset transistor that initializes the post-stage node, in which the other ends of the plurality of capacitive elements are connected in common to a pre-stage node to which the voltage is inputted, and, when the reset level is to be held, the vertical scanning circuit controls the post-stage reset transistor to an on state and performs soft reset on the pre-stage amplification transistor.

(4)

The solid-state image sensor according to (3) above, in which the plurality of selection transistors are pMOS (p-channel Metal Oxide Semiconductor) transistors.

(5)

The solid-state image sensor according to (3) or (4) above, in which the post-stage reset transistor is a pMOS transistor.

(6)

The solid-state image sensor according to any one of (3) through (5) above, further including:

a switching transistor that opens and closes between a source of the pre-stage amplification transistor and the pre-stage node; and a precharge transistor that opens and closes a path between the pre-stage node and a predetermined current source.

(7)

The solid-state image sensor according to any one of (1) through (6) above, in which the transfer transistor, the reset transistor, and the pre-stage amplification transistor are arranged on a first semiconductor chip, and the plurality of capacitive elements and the vertical scanning circuit are arranged on a second semiconductor chip.

(8)

The solid-state image sensor according to any one of (1) through (7) above, further including:

a conversion efficiency controlling transistor that controls charge-voltage conversion efficiency of the floating diffusion layer.

(9)

The solid-state image sensor according to any one of (1) through (8) above, further including:

a selector that supplies any one of a predetermined power supply voltage and a voltage different from the power supply voltage to a drain of the pre-stage amplification transistor.

(10)

An imaging apparatus including:

a transfer transistor that transfers charge from a photoelectric conversion element to a floating diffusion layer;

a reset transistor that initializes the floating diffusion layer;

a pre-stage amplification transistor that amplifies and outputs a voltage of the floating diffusion layer;

a plurality of capacitive elements that hold the outputted voltage;

a vertical scanning circuit that performs soft reset on the pre-stage amplification transistor when a reset level that is the voltage when the floating diffusion layer is initialized is to be held in any one of the plurality of capacitive elements; and a signal processing section that converts the voltage into a digital signal.

(11)

A control method for a solid-state image sensor, including:

a resetting step by a reset transistor of initializing a floating diffusion layer to which charge is transferred from a photoelectric conversion element;

a sample and hold step by a plurality of capacitive elements of holding a voltage outputted from a pre-stage amplification transistor that amplifies and outputs a voltage of the floating diffusion layer; and a vertical scanning step of performing soft reset, when a reset level that is the voltage when the floating diffusion layer is initialized is to be held in any one of the plurality of capacitive elements, on the pre-stage amplification transistor.

REFERENCE SIGNS LIST

100: Imaging apparatus
110: Imaging lens
120: Recording section
130: Imaging controlling section
200: Solid-state image sensor
201: Upper chip
202: Lower chip
211: Vertical scanning circuit
212: Timing controlling circuit
213: DAC
220: Pixel array section
221: Upper side pixel array section
222: Lower side pixel array section
250: Load MOS circuit block
251: Load MOS transistor
260: Column signal processing circuit
261: ADC
262: Digital signal processing section
300: Pixel
308: Selector
310: Pre-stage circuit
311: Photoelectric conversion element
312: Transfer transistor
313: Reset transistor
314: Conversion efficiency controlling transistor
315, 351, 352: Capacitive element
316: FD
317: Pre-stage amplification transistor
318: Switching transistor
320: Precharge transistor
321: Current source transistor
350: Sample and hold circuit
353, 354, 358: Selection transistor
355: Post-stage reset transistor
357: Post-stage amplification transistor
12031: Imaging section

The invention claimed is:

1. A solid-state image sensor, comprising:

a transfer transistor configured to transfer charge from a photoelectric conversion element to a floating diffusion layer, wherein a transfer signal is input to a gate of the transfer transistor;

a reset transistor configured to initialize the floating diffusion layer, wherein a reset signal is input to a gate of the reset transistor, and the transfer signal and the reset signal are controllable to one of a high level, a middle level, and a low level, wherein the middle level is lower than the high level, and the low level is lower than the middle level;

a pre-stage amplification transistor configured to:

amplify a first voltage of the floating diffusion layer; and output the amplified first voltage of the floating diffusion layer;

a plurality of capacitive elements configured to hold the outputted amplified first voltage of the floating diffusion layer; and a vertical scanning circuit configured to:

perform soft reset on the pre-stage amplification transistor in a case where a reset level is to be held in one of the plurality of capacitive elements, wherein the reset level is a voltage at which the floating diffusion layer is initialized;

in the case where the reset level is to be held, control the transfer signal and the reset signal from the middle level to the low level; and control the transfer signal and the reset signal from the low level to the middle level immediately before the charge is transferred.

2. The solid-state image sensor according to claim 1, further comprising:

a plurality of selection transistors configured to connect a first end of a first capacitive element of the plurality of capacitive elements to a post-stage node; and a post-stage reset transistor configured to initialize the post-stage node, wherein second ends of second capacitive elements of the plurality of capacitive elements are connected in common to a pre-stage node to which the voltage is inputted, and in the case where the reset level is to be held, the vertical scanning circuit is further configured to:

control the post-stage reset transistor to an on state; and perform the soft reset on the pre-stage amplification transistor.

3. The solid-state image sensor according to claim 2, wherein the plurality of selection transistors is pMOS (p-channel Metal Oxide Semiconductor) transistors.

4. The solid-state image sensor according to claim 2, wherein the post-stage reset transistor is a pMOS transistor.

5. The solid-state image sensor according to claim 2, further comprising:

a switching transistor configured to open and close between a source of the pre-stage amplification transistor and the pre-stage node; and a precharge transistor configured to open and close a path between the pre-stage node and a current source.

6. The solid-state image sensor according to claim 1, further comprising:

a first semiconductor chip; and a second semiconductor chip, wherein the transfer transistor, the reset transistor, and the pre-stage amplification transistor are the first semiconductor chip, and the plurality of capacitive elements and the vertical scanning circuit are on the second semiconductor chip.

7. The solid-state image sensor according to claim 1, further comprising a conversion efficiency controlling transistor configured to control charge-voltage conversion efficiency of the floating diffusion layer.

8. The solid-state image sensor according to claim 1, further comprising a selector configured to supply one of a power supply voltage or a second voltage, different from the power supply voltage, to a drain of the pre-stage amplification transistor.

9. An imaging apparatus, comprising:

a transfer transistor configured to transfer charge from a photoelectric conversion element to a floating diffusion layer, wherein a transfer signal is input to a gate of the transfer transistor;

a reset transistor configured to initialize the floating diffusion layer, wherein a reset signal is input to a gate of the reset transistor, and the transfer signal and the reset signal are controllable to one of a high level, a middle level, and a low level, wherein the middle level is lower than the high level, and the low level is lower than the middle level;

a pre-stage amplification transistor configured to:

amplify a voltage of the floating diffusion layer; and output the voltage of the floating diffusion layer;

a plurality of capacitive elements configured to hold the outputted voltage of the floating diffusion layer;

a vertical scanning circuit configured to:

perform soft reset on the pre-stage amplification transistor in a case where a reset level is to be held in one of the plurality of capacitive elements, wherein the reset level is a voltage at which the floating diffusion layer is initialized;

in the case where the reset level is to be held, control the transfer signal and the reset signal from the middle level to the low level; and control the transfer signal and the reset signal from the low level to the middle level immediately before the charge is transferred; and a signal processing section configured to convert the voltage held in the plurality of capacitive elements into a digital signal.

10. A control method for a solid-state image sensor, comprising:

inputting a transfer signal to a gate of a transfer transistor;

transferring, by the transfer transistor, charge from a photoelectric conversion element to a floating diffusion layer based on the transfer signal;

inputting a reset signal to a gate of a reset transistor, wherein the transfer signal and the reset signal are controllable to one of a high level, a middle level, and a low level, wherein the middle level is lower than the high level, and the low level is lower than the middle level;

initializing, by the reset transistor, the floating diffusion layer to which the charge is transferred from the photoelectric conversion element;

amplifying, by a pre-stage amplification transistor, a voltage of the floating diffusion layer;

outputting, by the pre-stage amplification transistor, the voltage of the floating diffusion layer;

holding, by a plurality of capacitive elements, the voltage outputted from the pre-stage amplification transistor;

performing soft reset on the pre-stage amplification transistor in a case where a reset level is to be held in one of the plurality of capacitive elements, wherein the reset level is a voltage at which the floating diffusion layer is initialized;

in the case where the reset level is to be held, controlling the transfer signal and the reset signal from the middle level to the low level; and controlling the transfer signal and the reset signal from the low level to the middle level immediately before the charge is transferred.

\* \* \* \* \*